US011711610B2

(12) United States Patent
Torikai

(10) Patent No.: US 11,711,610 B2
(45) Date of Patent: Jul. 25, 2023

(54) COMMUNICATION APPARATUS, CONTROL METHOD, AND RECORDING MEDIUM

(71) Applicant: CANON KABUSHIKI KAISHA, Tokyo (JP)

(72) Inventor: Hiroyuki Torikai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 452 days.

(21) Appl. No.: 17/088,006

(22) Filed: Nov. 3, 2020

(65) Prior Publication Data

US 2021/0144311 A1 May 13, 2021

(30) Foreign Application Priority Data

Nov. 8, 2019 (JP) .................................. 2019-203426

(51) Int. Cl.
| | |
|---|---|
| H04L 29/06 | (2006.01) |
| H04N 23/661 | (2023.01) |
| H04L 67/1074 | (2022.01) |
| H04L 9/08 | (2006.01) |
| H04W 4/80 | (2018.01) |
| H04L 67/51 | (2022.01) |

(52) U.S. Cl.
CPC ......... *H04N 23/662* (2023.01); *H04L 9/0822* (2013.01); *H04L 67/1078* (2013.01); *H04L 67/51* (2022.05); *H04W 4/80* (2018.02)

(58) Field of Classification Search
CPC .. H04N 23/662; H04N 23/661; H04L 9/0822; H04L 67/1078; H04L 67/51; H04W 4/80; H04W 12/03; H04W 12/50
See application file for complete search history.

(56) References Cited

U.S. PATENT DOCUMENTS

| | | | | |
|---|---|---|---|---|
| 8,392,850 | B2 * | 3/2013 | Nakagawa | H04N 1/32117 715/838 |
| 10,420,152 | B2 * | 9/2019 | Torikai | H04W 12/06 |
| 2017/0255423 | A1 * | 9/2017 | Yoshida | G06F 3/1292 |
| 2019/0380161 | A1 * | 12/2019 | Song | H04W 84/18 |

FOREIGN PATENT DOCUMENTS

JP 2016009986 A 1/2016

* cited by examiner

*Primary Examiner* — Harunur Rashid
(74) *Attorney, Agent, or Firm* — Canon U.S.A., Inc. IP Division

(57) ABSTRACT

A communication apparatus includes a first communication unit for unencrypted communication compliant with a first standard for communication, and a second communication unit for encrypted communication compliant with a second standard for communication, In a case where connection information used for the second communication unit to perform encrypted communication with an external apparatus has been received from the external apparatus via the first communication unit, a control unit records the connection information on a recording medium. In a case where connection with the external apparatus has been established via the first communication unit, the control unit determines whether the connection information is currently recorded on the recording medium, and, in a case where it has been determined that the connection information is not currently recorded on the recording medium, the control unit causes a notification unit to issue a notification indicating that the connection information is not currently recorded.

18 Claims, 20 Drawing Sheets

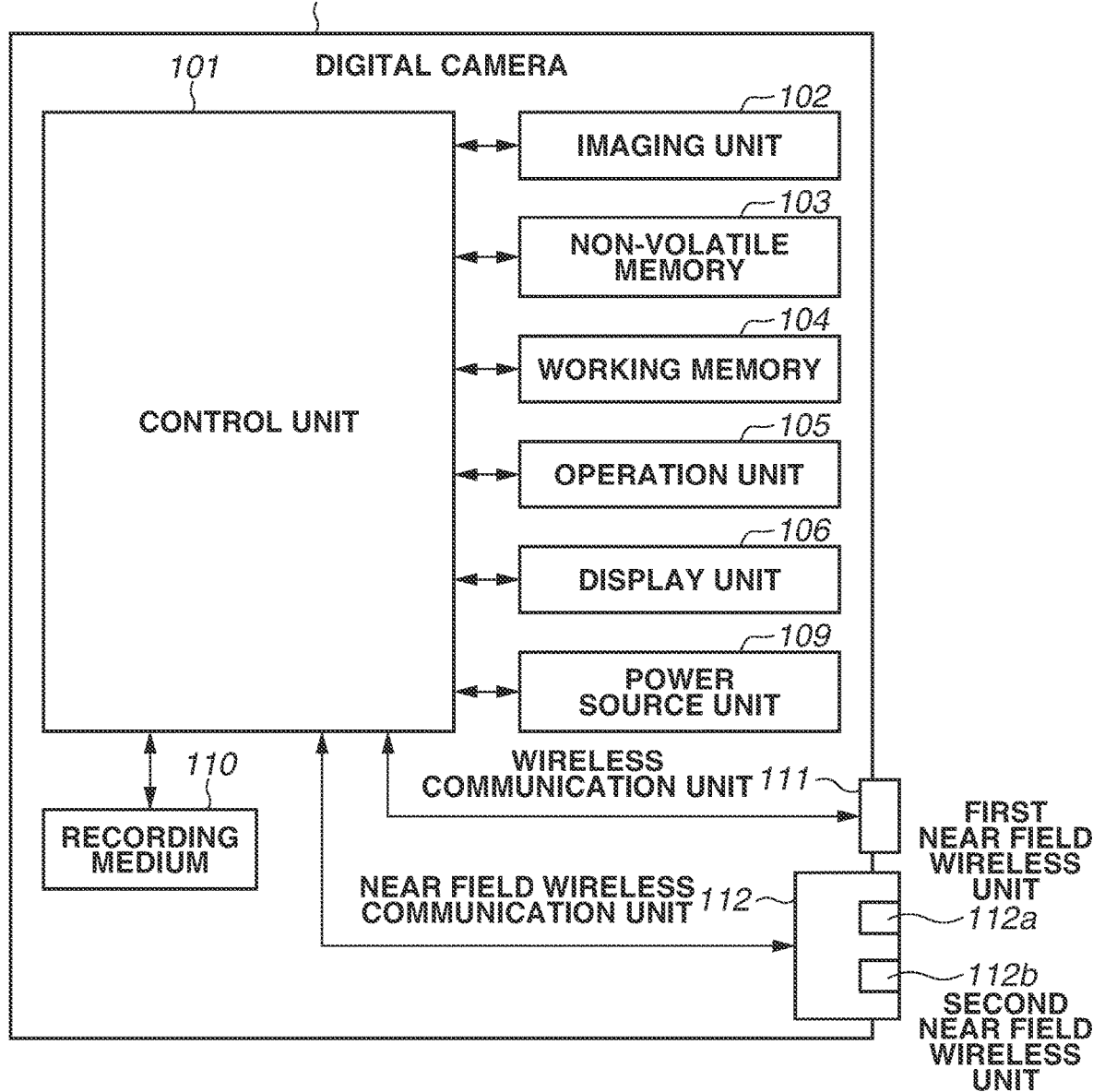
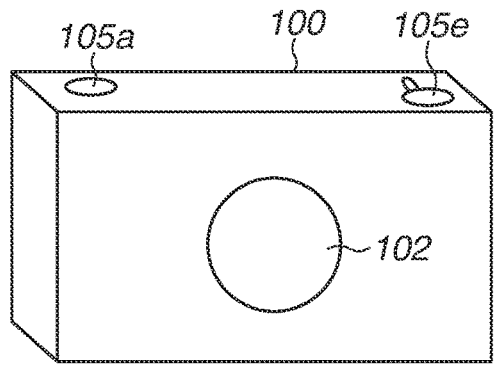
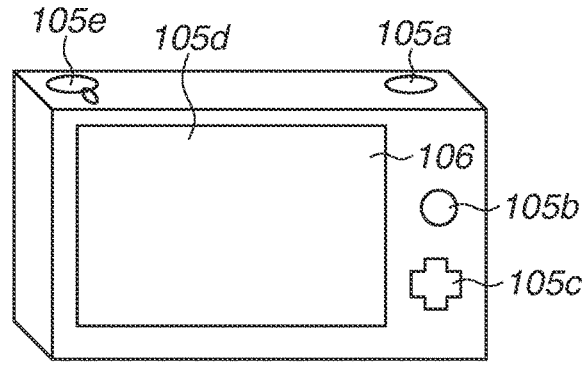

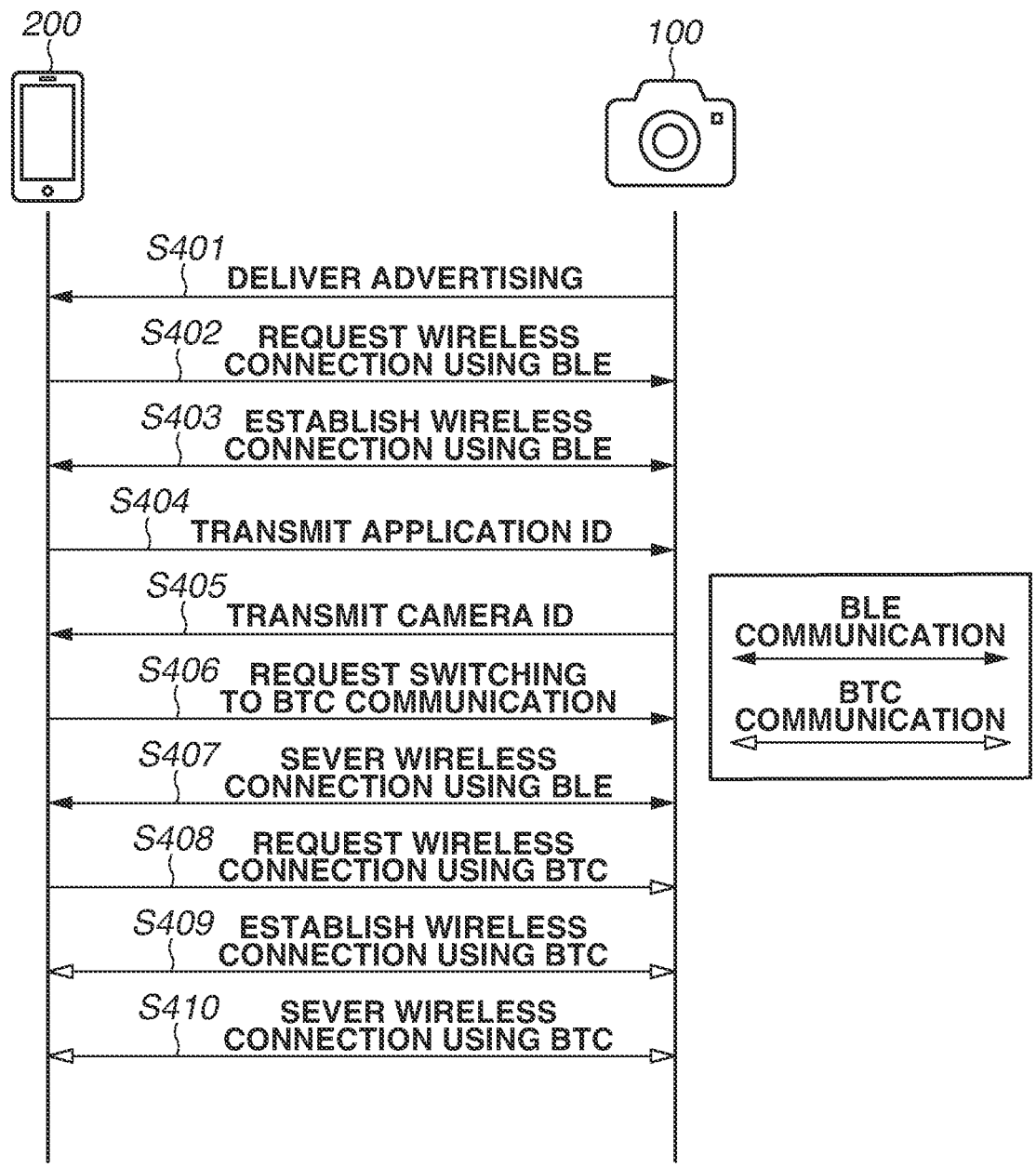

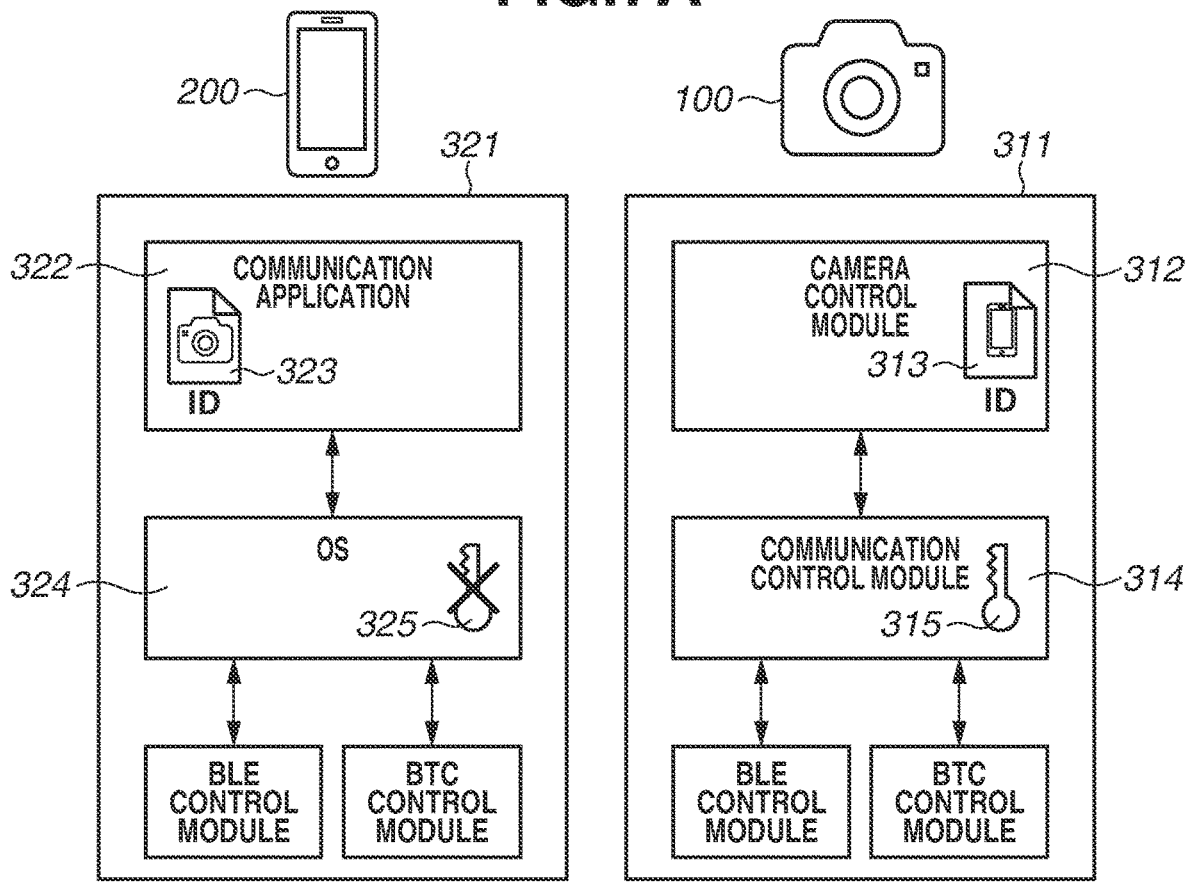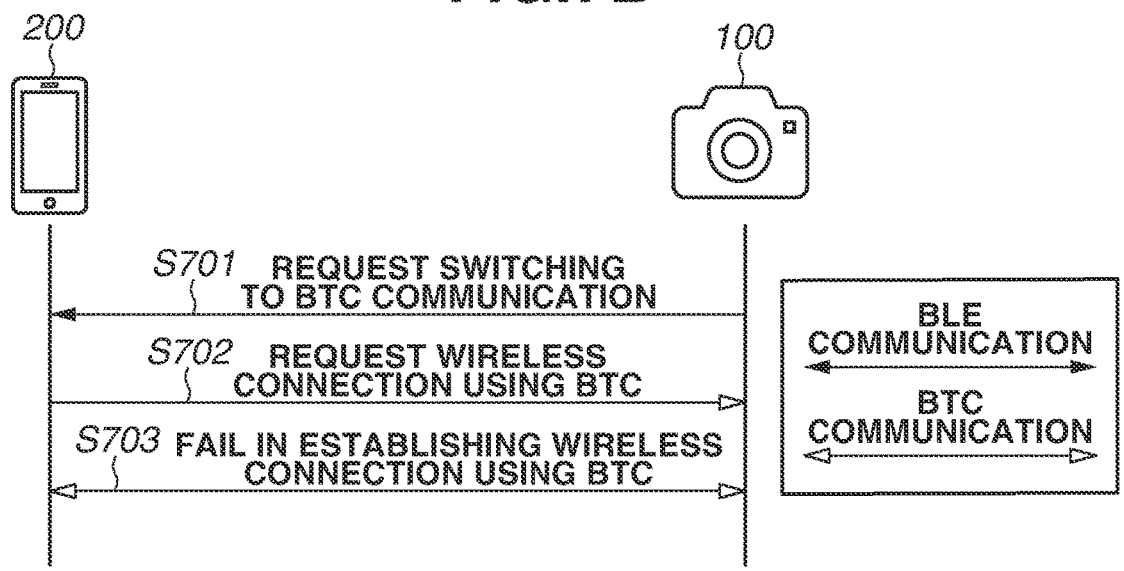

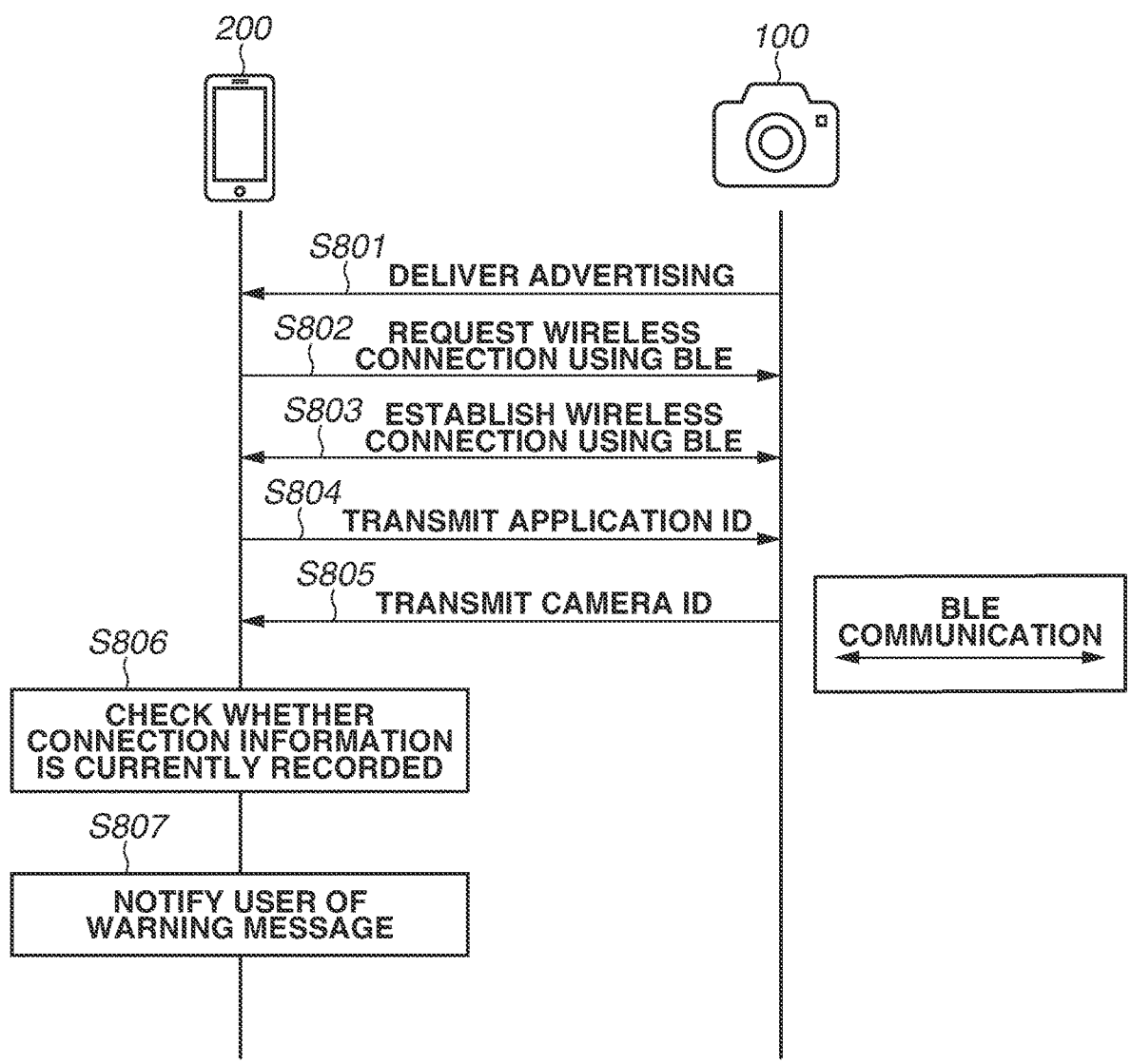

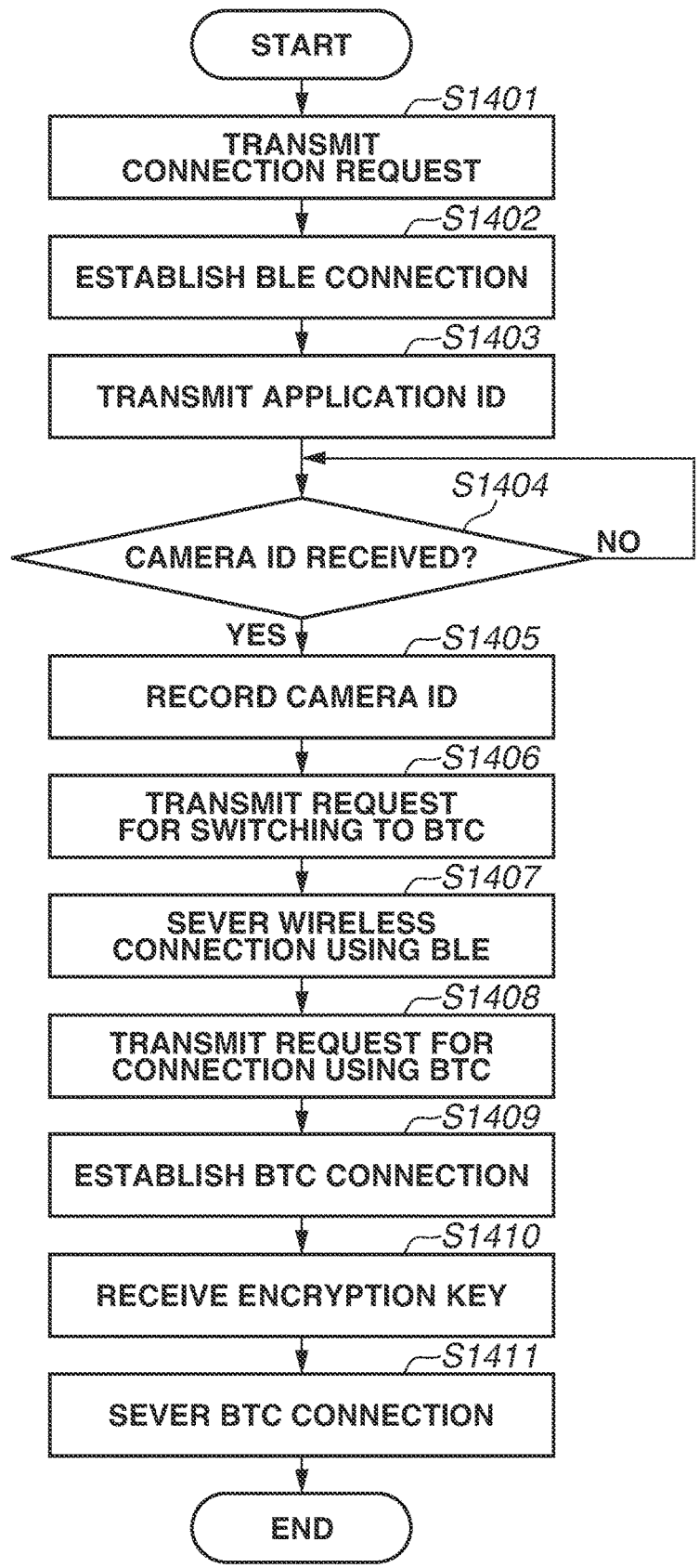

COMMUNICATION APPARATUS, CONTROL METHOD, AND RECORDING MEDIUM

BACKGROUND

Field

The present disclosure generally relates to a communication apparatus capable of performing wireless communication.

Description of the Related Art

Recently, some communication apparatuses such as digital cameras have been configured to be able to perform wireless communication with an external apparatus such as a smartphone. Standards which may be used for such wireless communication include, for example, standards relating to a wireless local area network (LAN) and Bluetooth®. When performing wireless communication with an external apparatus, a digital camera may be required to exchange with the external apparatus, for example, pieces of connection information and then record such connection information. In Bluetooth®, a process in which two devices exchange and then record, for example, pieces of connection information about each other is called pairing.

Such communication apparatuses include some apparatuses capable of performing wireless communication by a plurality of standards for wireless communication. For example, in a case where a digital camera is capable of performing wireless communication in conformity with two different standards such as Bluetooth Low Energy (BLE) and Bluetooth Classic (BTC), the digital camera can use these two standards for wireless communication, for example, in the following way. The digital camera wirelessly connects to a smartphone via BLE and then receives, for example, Global Positioning System (GPS) information and clock time information from the smartphone (external apparatus). Moreover, the digital camera performs a handover (handoff) from a communication compliant with BLE to a communication compliant with BTC as needed and then transmits image data to the smartphone. Furthermore, note that both of those standards for wireless communication are standards formulated in Bluetooth®, but are not compatible with each other. Japanese Patent Application Laid-Open No. 2016-9986 discusses a digital camera performing a handover in wireless communication with a smartphone.

For example, in a case where a digital camera has deleted connection information about a smartphone acquired by pairing of BTC, the digital camera and the smartphone become unable to establish a wireless connection compliant with BTC. On the other hand, since pairing of BLE is performed independently of pairing of BTC, even in such a case, the digital camera is able to establish a wireless connection compliant with BLE with respect to the smartphone. However, because of being unable to perform wireless connection via BTC, after establishing a wireless connection compliant with BLE with respect to the smartphone, the digital camera is not able to perform a handover to BTC. Then, in a case where a discrepancy is occurring in this manner between pieces of connection information which the digital camera and the smartphone respectively record, even if the user causes the digital camera to wirelessly connect to a given smartphone in conformity with one standard for wireless communication, the user may not be able to cause the digital camera to perform a handover to the other standard for wireless communication. Then, because, it may not be until the time of causing the digital camera to perform handover processing, that the user becomes aware that the digital camera and the smartphone are not able to perform a handover, too much time may elapse before the user acknowledges a situation in which the user is not able to use the handover.

SUMMARY

According to various embodiments of the present disclosure, a communication apparatus includes a first communication unit configured to perform unencrypted communication with an external apparatus in conformity with a first standard for communication, a second communication unit configured to perform encrypted communication with the external apparatus in conformity with a second standard for communication, which is different from the first standard for communication, a recording medium, a notification unit, and a control unit. In a case where the control unit has received, from the external apparatus via the first communication unit, connection information used for the second communication unit to perform encrypted communication with the external apparatus, the control unit records the connection information on the recording medium. In a case where the control unit has established connection with the external apparatus via the first communication unit, the control unit determines whether the connection information used for the second communication unit to perform encrypted communication with the external apparatus recorded by being received from the external apparatus is currently recorded on the recording medium, and, in a case where the control unit has determined that the connection information used for the second communication unit to perform encrypted communication with the external apparatus recorded by being received from the external apparatus is not currently recorded on the recording medium, the control unit causes the notification unit to issue a notification indicating that the connection information is not currently recorded.

Further features will become apparent from the following description of exemplary embodiments with reference to the attached drawings.

BRIEF DESCRIPTION OF THE DRAWINGS

FIG. 1A is an example of a block diagram of a digital camera in a first exemplary embodiment. FIG. 1B is an example of a front side perspective view of the digital camera.

FIG. 1C is an example of a back side perspective view of the digital camera.

FIG. 4 is a sequence diagram illustrating an example of pairing processing which the digital camera and the smartphone perform via Bluetooth Classic (BTC) in the first exemplary embodiment.

FIG. 7A is an example of a software configuration diagram of each of the digital camera and the smartphone in a case where the user has deleted connection information about the digital camera recorded in the smartphone in the first exemplary embodiment. FIG. 7B is a sequence diagram illustrating an example of wireless connection processing performed in a case where the user has deleted connection information about the digital camera recorded in the smartphone in the first exemplary embodiment.

FIG. 8 is a sequence diagram illustrating an example of processing in which, in a case where connection information about the digital camera has been deleted, the smartphone issues a notification indicating that no connection information about the digital camera is currently recorded therein, in the first exemplary embodiment.

FIG. 14 is a flowchart illustrating an example of processing in which the smartphone performs pairing with the digital camera in the first exemplary embodiment.

DESCRIPTION OF THE EMBODIMENTS

Figure 2:
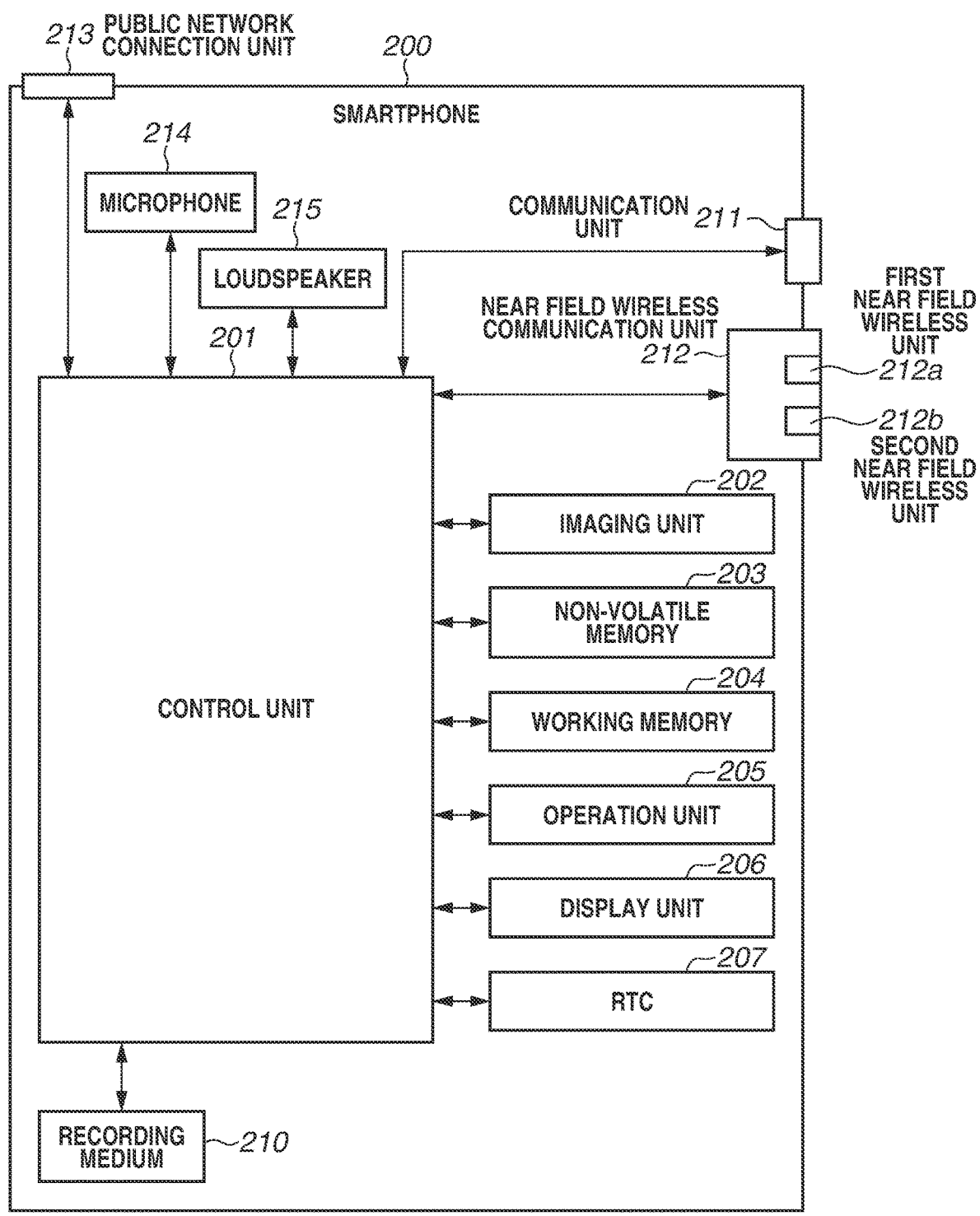
FIG. 2 is a hardware configuration diagram illustrating a configuration example of a smartphone in the first exemplary embodiment.

Various embodiments, features, and aspects of the present disclosure will be described in detail below with reference to the drawings. Furthermore, it is noted that the following exemplary embodiments are not intended to limit the scope of the invention set forth in the claims. While a plurality of features is described in each exemplary embodiment, each of the plurality of features is not necessarily essential for the invention and, moreover, some or all of the plurality of features may be combined in an alternative manner.

<Configuration of Digital Camera>

FIG. 1A is an example of a block diagram of a digital camera 100, which is an example of an external apparatus in a first exemplary embodiment. Furthermore, while, here, a digital camera is described as an example of an external apparatus, the external apparatus is not limited to this. For example, the external apparatus can include apparatuses such as a portable media player, what is called a tablet device, a smartphone, a smart watch, a smart speaker, and a personal computer.

A control unit 101 controls input signals and various processing units described below. For example, the control unit 101 is a central processing unit (CPU). Moreover, the control unit 101 also functions as a communication control unit used for communication with an external apparatus with use of a plurality of communication units. Furthermore, instead of the control unit 101 controlling the entire apparatus, a plurality of pieces of hardware can share processing to control the entire apparatus.

An imaging unit 102 includes, for example, an optical lens unit and an optical system which controls, for example, an aperture, zooming, and focusing. Moreover, the imaging unit 102 further includes, for example, an image sensor, which converts light (video image) entered via the optical lens unit into an electrical video signal, and an analog-to-digital (A/D) converter, which converts the electrical video signal obtained by the image sensor into a digital signal. While, as the image sensor, a complementary metal-oxide semiconductor (CMOS) sensor or a charge-coupled device (CCD) sensor is generally known, any type of sensor can be employed. The imaging unit 102 is controlled by the control unit 101 to convert the image of subject light formed by a lens included in the imaging unit 102 into an electrical signal by the image sensor, perform, for example, noise reduction processing on the electrical signal, and then output the processed signal as digital image data. The digital camera 100 in the first exemplary embodiment codes image data obtained by image capturing according to, for example, Joint Photographic Experts Group (JPEG). Moreover, the digital camera 100 in the first exemplary embodiment records the coded data as an image file on a recording medium 110 according to the standard of Design rule for Camera File system (DCF).

A non-volatile memory 103, which is an electrically erasable and recordable memory of non-volatility, stores programs described below which are executed by the control unit 101 and various parameters.

A working memory 104 is used as, for example, a buffer memory which temporarily retains image data obtained by image capturing performed by the imaging unit 102, an image displaying memory for a display unit 106, and a work area for the control unit 101.

An operation unit 105 is an interface which receives an instruction issued by the user to the digital camera 100. The operation unit 105 includes, for example, a power switch which is used for the user to issue an instruction for powering on and off the digital camera 100, a release switch which is used to issue an instruction for performing image capturing, and a playback button which is used to issue an instruction for playing back image data. Moreover, the operation unit 105 further includes an operation member such as a dedicated connection button used to start communication with an external apparatus via a wireless communication unit 111 described below. Moreover, a touch panel formed on the display unit 106 described below is also included in the operation unit 105. Furthermore, the release switch includes two switches and communicates the pressed states thereof (unpressed, half-pressed, and full-pressed) to the control unit 101. Specifically, the release switch entering what is called a half-pressed state turns on a first switch signal. This causes the control unit 101 to make image capturing preparations, such as automatic focus (AF) processing, automatic exposure (AE) processing, automatic white balance (AWB) processing, and electronic flash pre-emission (EF) processing. Moreover, the release switch entering a full-pressed state turns on a second switch signal. This causes the control unit 101 to perform image capturing and recording processing.

The display unit 106 performs displaying of a viewfinder image in image capturing, displaying of image data obtained by image capturing, and displaying of characters for an interactive operation (including displaying of a processing menu). Besides, the display unit 106 also performs turning-on, blinking, and turning-off lighting displaying using, for example, a lamp. For example, such displaying is performed to display, for example, an access state to the recording medium 110 described below and a communication state of the wireless communication unit 111 or a near field wireless communication unit 112. Furthermore, the display unit 106 does not need to be necessarily incorporated in the digital camera 100. The digital camera 100 only needs to be capable of connecting to the display unit 106 arranged inside or outside the digital camera 100 and to have at least a display control function for controlling displaying to be performed by the display unit 106.

A power source unit 109 is controlled by the control unit 101 to be able to supply electric power to respective elements of the digital camera 100. The power source unit 109 is a power source such as a lithium-ion battery or an alkaline manganese battery.

The recording medium 110 is capable of recording image data output from the imaging unit 102. The recording medium 110 can be configured to be attachable to and detachable from the digital camera 100 or can be incorporated in the digital camera 100. In other words, the digital camera 100 only needs to include at least a unit which accesses the recording medium 110. For example, the recording medium 110 includes a Secure Digital (SD) card, a CompactFlash (CF) card, a hard disk drive (HDD), and a solid state drive (SSD).

The wireless communication unit 111 is an interface used for connection with an external apparatus. The digital camera 100 in the first exemplary embodiment is able to exchange data with an external apparatus via the wireless communication unit 111. For example, the digital camera 100 is able to transmit image data generated by the imaging unit 102 to an external apparatus via the wireless communication unit 111. Furthermore, in the first exemplary embodiment, the wireless communication unit 111 includes an interface used for performing communication with an external apparatus via what is called a wireless local area network (LAN) compliant with the standard of IEEE 802.11. The control unit 101 implements wireless communication with an external apparatus by controlling the wireless communication unit 111.

The near field wireless communication unit 112 is configured with, for example, an antenna used for wireless communication, a modulation and demodulation circuit used for processing a wireless signal, and a communication controller. The near field wireless communication unit 112 implements near field wireless communication compliant with Bluetooth® by outputting a modulated wireless signal from the antenna and demodulating a wireless signal received by the antenna. Bluetooth® is a standard designed by the Bluetooth Special Interest Group (Bluetooth SIG).

In the first exemplary embodiment, the near field wireless communication unit 112 includes a first near field wireless unit 112*a* and a second near field wireless unit 112*b*. The first near field wireless unit 112*a* includes an interface used for performing communication in conformity with Bluetooth Low Energy (BLE). The second near field wireless unit 112*b* includes an interface used for performing communication in conformity with Bluetooth Classic (BTC).

Here, Bluetooth communication is described. The connection topology of Bluetooth communication is a master-slave type star network. In the first exemplary embodiment, a smartphone 200 described below is a communication apparatus which operates as a master (hereinafter referred to as a "master apparatus"), and the digital camera 100 is a communication apparatus which operates as a slave (hereinafter referred to as a "slave apparatus"). The master apparatus performs, for example, management of participation of the slave apparatus in a network and setting of various parameters in wireless connection with the slave apparatus. While the master apparatus is able to connect simultaneously to a plurality of slave apparatuses, the slave apparatus is able to establish wireless connection with only one master apparatus at one time. Moreover, master apparatuses are not able to establish wireless connection with each other, so that, to establish wireless connection, one apparatus is required to operate as a master apparatus and the other apparatus is required to operate as a slave apparatus.

In the first exemplary embodiment, the digital camera 100 performs pairing with the smartphone 200 described below, and records connection information about the smartphone 200 on the non-volatile memory 103. Pairing is processing which the master apparatus and the slave apparatus perform to mutually register (record in predetermined regions) pieces of connection information about each other. The connection information includes, for example, an encryption key and a media access control (MAC) address. In the first exemplary embodiment, the digital camera 100 determines that pairing has been completed by establishing wireless connection with the smartphone 200 after the digital camera 100 and the smartphone 200 mutually register pieces of connection information about each other. Specific processing for pairing is described below.

Furthermore, both BLE and BTC are standards formulated in Bluetooth*, but are not compatible with each other. In BLE communication, for example, the digital camera 100 is able to transmit and receive a relatively small volume of data, such as clock time information or coordinate information for GPS, with respect to a smartphone. Moreover, in BTC communication, for example, the digital camera 100 is able to transmit and receive a relatively large volume of data, such as still image data or moving image data, with respect to a smartphone. Moreover, BLE communication is generally low in power consumption as compared with BTC communication. On the other hand, BTC communication is generally high in communication speed as compared with BLE communication. The digital camera 100 in the first exemplary embodiment is able to perform always-on connection with the smartphone 200 via BLE. Then, switching from BLE communication to BTC communication is able to be automatically performed in response to an operation performed on the digital camera 100 or the smartphone 200.

Next, an example of an outer appearance of the digital camera 100 is described. FIG. 1B is an example of a front side perspective view (lens side) of the digital camera 100, and FIG. 1C is an example of a back side perspective view of the digital camera 100. A release switch 105*a*, a playback button 105*b*, arrow keys 105*c*, a touch panel 105*d*, and a power lever 105*e* are operation members included in the operation unit 105. Moreover, the display unit 106 allows an image obtained as a result of image capturing performed by the imaging unit 102 or various menus to be displayed thereon.

Moreover, the digital camera 100 in the first exemplary embodiment has three power states, i.e., a power-on state, a standby state, and a power-off state. The power-on state is a state in which electric power is supplied to the entire digital camera 100. However, the "state in which electric power is supplied to the entire digital camera 100" is assumed to refer to not a state in which electric power is supplied to, for example, all of the elements and circuits but a state in which electric power is supplied to at least members required to perform processing for the first exemplary embodiment. The standby state is a state in which electric power is supplied to at least the control unit 101 and no electric power is supplied to at least the imaging unit 102 and the display unit 106. The standby state is a state smaller in power consumption than the power-on state. Moreover, the power-off state is a state in which no electric power is supplied to at least the control unit 101, the imaging unit 102, and the display unit 106 and electric power is supplied to a portion required for controlling the power source unit 109. The power-off state is smaller in power consumption than the standby state.

The digital camera 100 transitions to the standby state in a period of time in which the digital camera 100 is less likely to be operated by the user. For example, when determining that, in the power-on state, the digital camera 100 has not received an operation from the user for a predetermined time or more, the digital camera 100 transitions to the standby state. This is processing which the digital camera 100 performs to reduce consumption of electric power in a period of time in which the digital camera 100 is less likely to be operated by the user. In the standby state, in a case where a member of the operation unit 105 such as a power switch or a menu button has been operated, the digital camera 100 transitions to the power-on state.

Moreover, in a case where the digital camera 100 has received an instruction for powering off from the user, the digital camera 100 transitions to the power-off state. For example, in the power-on state, in a case where the power switch has been pressed, the digital camera 100 transitions to the power-off state. In the power-off state, in a case where the power switch has been pressed, the digital camera 100 transitions to the power-on state. However, in the power-off state, even if an operation member such as the release switch or the touch panel is operated, the digital camera 100 does not transition to the power-on state. The reason for this is as follows. For example, since a case where the user stores the digital camera 100, which is in the power-off state, in, for example, a bag may be assumed, it is necessary to reduce the possibility that the digital camera 100 erroneously starts up due to, for example, an impact caused by the digital camera 100 colliding with goods contained in the bag. Furthermore, the digital camera 100 when being in the standby state is able to transition to the power-on state in a shorter period of time than the digital camera 100 when in the power-off state.

The digital camera 100 in the first exemplary embodiment has a function to transmit image data to the smartphone 200 described below via the near field wireless communication unit 112, for example, in response to, as a trigger, receiving an instruction for powering off from the user. Hereinafter, this function is referred to as an "image automatic transmission function". At this time, the digital camera 100 transmits image data not when in the power-off state but when in the power-on state. The reason for using receiving an instruction for powering off from the user as a trigger is that, in a case where the user has performed an operation for powering off, the user is considered not to operate the digital camera 100 for a while. Moreover, the reason for transmitting image data when in the power-on state is that, in a power saving state such as the power-off state or the standby state, it is hard for the digital camera 100 to perform processing imposing a large load thereon, such as transmission processing for image data. In this way, transmitting image data in response to receiving an instruction for powering off from the user as a trigger enables the digital camera 100 to transmit image data in a period of time in which the digital camera 100 is less likely to be operated by the user.

Furthermore, after transitioning to the power-off state once, the digital camera 100 can transition to the power-on state and then start automatic transmission for image data. This is because, in a case where, irrespective of receiving an operation for powering off, the digital camera 100 has transmitted image data when remaining in the power-on state, the user may be misled into thinking that the digital camera 100 is malfunctioning. On the other hand, the digital camera 100 transitioning to the power-off state once before starting transmission of image data enables the user to become able to recognize that the user's operation has been received, thus reducing such a misunderstanding.

Thus far is the description of an example of a configuration of the digital camera 100 in the first exemplary embodiment.

<Configuration of Smartphone>

FIG. 2 is a hardware configuration diagram illustrating a configuration example of the smartphone 200, which is an example of a communication apparatus in the first exemplary embodiment. Furthermore, while, here, a smartphone is described as an example of a communication apparatus, the communication apparatus is not limited to this. For example, the communication apparatus can include a digital camera, a tablet device, a smart watch, and a personal computer.

A control unit 201 controls each unit of the smartphone 200 according to input signals and programs described below. Furthermore, instead of the control unit 201 controlling the entire apparatus, a plurality of pieces of hardware can share processing to control the entire apparatus.

A non-volatile memory 203 is an electrically erasable and recordable memory of non-volatility. The non-volatile memory 203 has, recorded thereon, an operating system (OS), which is basic software to be executed by the control unit 201, and applications, which implement applicative functions in cooperation with the OS. Moreover, in the first exemplary embodiment, the non-volatile memory 203 stores an application used for performing communication with the digital camera 100 (hereinafter referred to as a "communication application"). The communication application is an application which is installed on the OS. In the first exemplary embodiment, the user uses the communication application to cause the smartphone 200 to perform wireless communication with the digital camera 100.

A working memory 204 is used as, for example, an image displaying memory for a display unit 206 and a work area for the control unit 201.

An operation unit 205 is used to receive an instruction directed to the smartphone 200 from the user. The operation unit 205 includes, for example, a power button used for the user to issue an instruction for powering on or off the smartphone 200, an operation member for setting a real time clock (RTC) 207, and an operation member such as a touch panel formed on the display unit 206.

The display unit 206 performs, for example, displaying of image data and displaying of characters for an interactive operation. Furthermore, the display unit 206 does not need to be necessarily included in the smartphone 200. The smartphone 200 only needs to be able to be connected to the display unit 206 and at least include a display control function of controlling displaying to be performed by the display unit 206.

The RTC 207 is a real time clock which performs time-of-day management. For example, the user performs time-of-day setting to the RTC 207 via the operation unit 205. Moreover, for example, the RTC 207 is able to acquire clock time information via a communication unit 211, a near field wireless communication unit 212, or a public network connection unit 213 and then perform time-of-day setting. Furthermore, in a case where the smartphone 200 is capable of receiving standard radio waves, the RTC 207 can perform time-of-day setting based on the standard radio waves. In this way, the RTC 207 only needs to be able to manage clock time. Besides, the smartphone 200 can be an apparatus capable of acquiring clock time by a detection mechanism from a mechanical structure such as an analog clock. In this case, the RTC 207 includes a detection mechanism for detection from an analog clock.

A recording medium 210 is able to record image data which the smartphone 200 has received via the communication unit 211. The recording medium 210 can be configured to be attachable to and detachable from the smartphone 200 or can be incorporated in the smartphone 200. In other words, the smartphone 200 only needs to include at least a unit which accesses the recording medium 210. For example, the recording medium 210 includes an SD card, a CF card, and a solid state drive (SSD).

The communication unit 211 is an interface used for connection with an external apparatus. The smartphone 200 in the first exemplary embodiment is able to exchange data with an external apparatus via the communication unit 211. In the first exemplary embodiment, the communication unit 211 is an antenna, and the control unit 201 is able to connect to the digital camera 100 via the antenna. Furthermore, in the first exemplary embodiment, the communication unit 211 includes an interface used for performing communication with an external apparatus via what is called a wireless LAN compliant with the standard of IEEE 802.11. The control unit 201 implements wireless communication with an external apparatus by controlling the wireless communication unit 211.

The near field wireless communication unit 212 is an interface used for connection with an external apparatus. The near field wireless communication unit 212 implements near field wireless communication compliant with Bluetooth® by outputting a modulated wireless signal from an antenna thereof and demodulating a wireless signal received by the antenna. In the first exemplary embodiment, the near field wireless communication unit 212 includes a first near field wireless unit 212a and a second near field wireless unit 212b. The first near field wireless unit 212a includes an interface used to perform communication in conformity with BLE. The second near field wireless unit 212b includes an interface used to perform communication in conformity with BTC.

Furthermore, as mentioned above, the smartphone 200 in the first exemplary embodiment operates as a master apparatus. The smartphone 200 performs pairing with the digital camera 100, and then records connection information about the digital camera 100 on the non-volatile memory 203.

Thus far is the description of an example of a configuration of the smartphone 200.

<Software Configuration>

Figure 3:
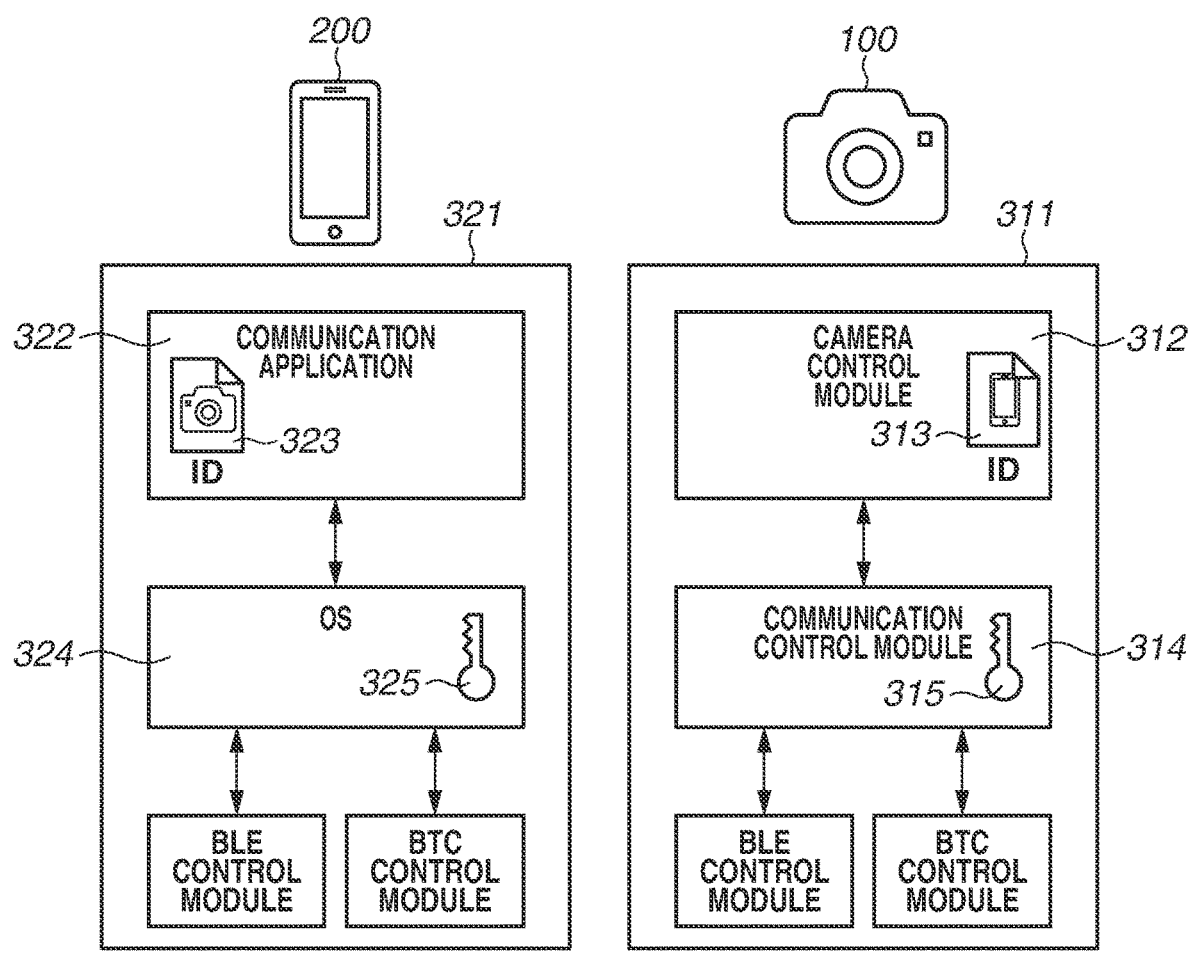
FIG. 3 is an example of a software configuration diagram of each of the digital camera and the smartphone in the first exemplary embodiment.

FIG. 3 is an example of a software configuration diagram of each of the digital camera 100 and the smartphone 200.

A software module group 311 is an example of a group of software modules which the control unit 101 of the digital camera 100 executes. A camera control module 312 is a software module which assumes controlling the entire digital camera 100. Moreover, the camera control module 312 is able to perform wireless communication with an external apparatus by cooperating with a communication control module 314. The communication control module 314 cooperates with a BLE control module and a BTC control module to implement wireless communication using BLE and BTC, respectively. An application identifier (ID) 313 and an encryption key 315 are described below.

A software module group 321 is an example of a group of software modules which the control unit 201 of the smartphone 200 executes. A communication application 322 is an application for implementing a wireless communication function with the digital camera 100 in the smartphone 200. The communication application 322 is able to perform wireless communication with an external apparatus by cooperating with an operating system (OS) 324. The OS 324 cooperates with a BLE control module and a BTC control module to implement wireless communication using BLE and BTC, respectively. A camera ID 323 and an encryption key 325 are described below.

In the first exemplary embodiment, the digital camera 100 and the smartphone 200 perform unencrypted communication in the case of BLE communication, and perform encrypted communication in the case of BTC communication. The reason for this is described below. Since pairing is unnecessary in the case of unencrypted communication, the digital camera 100 and the smartphone 200 do not perform pairing processing required for BLE. On the other hand, since pairing is necessary in the case of encrypted communication, the digital camera 100 and the smartphone 200 perform pairing processing required for BTC.

<Pairing Processing>

An example of a series of processing operations which the digital camera 100 and the smartphone 200 perform for pairing using BTC is described as follows with reference to FIG. 4 together with the description of FIG. 3. In the first exemplary embodiment, first, the digital camera 100 and the smartphone 200 perform BLE connection and then perform pairing processing using BTC via BLE communication. Hereinafter, establishing wireless connection using BTC via BLE communication is referred to as a "handover". This handover enables, for example, the user to also perform pairing processing using BTC only by causing the digital camera 100 and the smartphone 200 to perform wireless connection using BLE.

FIG. 4 is a sequence diagram illustrating an example of pairing processing using BTC which the digital camera 100 and the smartphone 200 perform. Processing in the present sequence is started in response to, for example, the user operating the digital camera 100 to issue an instruction for starting pairing.

In step S401, the digital camera 100 delivers advertising to therearound via BLE. The advertising which the digital camera 100 delivers does not include an application ID 313 described below. The smartphone 200 receives the delivered advertising.

In step S402, the smartphone 200 requests the digital camera 100 to perform wireless connection using BLE. For example, when having received an operation to issue an instruction for starting pairing with the digital camera 100 from the user, the smartphone 200 transmits a connection request to the digital camera 100. The digital camera 100 receives the transmitted connection request.

In step S403, the digital camera 100 and the smartphone 200 establish wireless connection using BLE.

In step S404, the smartphone 200 transmits the application ID 313 of the communication application 322 to the digital camera 100. The digital camera 100 records the application ID 313 as identification information about the smartphone 200. The application ID 313 is data which is to be used in the camera control module 312.

In step S405, the digital camera 100 transmits the camera ID 323 to the smartphone 200. The smartphone 200 records the camera ID 323. The camera ID 323 is identification information usable for identifying a communication partner in BTC communication. Moreover, the camera ID 323 is to be used in the communication application 322. For example, the camera ID 323 is, for example, a MAC address in BTC communication of the digital camera 100 or an ID allocated by the OS 324.

In step S406, the smartphone 200 transmits, to the digital camera 100 via BLE communication, a request packet for requesting switching to BTC communication. In response to receiving the request packet, the digital camera 100 transitions to a state capable of performing connection using BTC.

In step S407, the digital camera 100 and the smartphone 200 disconnect the wireless connection using BLE.

In step S408, the smartphone 200 transmits, to the digital camera 100 with use of the camera ID 323, a packet for requesting wireless connection using BTC.

In step S409, the digital camera 100 and the smartphone 200 establish wireless connection using BTC. Here, the digital camera 100 and the smartphone 200 exchange encryption keys used for encrypting BTC communication. In the first exemplary embodiment, the digital camera 100 records the encryption key 315 as data which is to be used in the communication control module 314. Moreover, in the first exemplary embodiment, the smartphone 200 records the encryption key 325 as data which is to be used by the OS 324. Moreover, in the first exemplary embodiment, the smartphone 200 records the encryption key 325 while associating the encryption key 325 with the camera ID 323. In processing in the present step, pairing processing using BTC which is performed by the digital camera 100 and the smartphone 200 is completed.

In step S410, the digital camera 100 and the smartphone 200 determine that pairing processing is completed and thus disconnect the wireless connection using BTC.

Thus far is the description of an example of pairing processing using BTC which is performed by the digital camera 100 and the smartphone 200 in the first exemplary embodiment. In this way, in the first exemplary embodiment, the digital camera 100 and the smartphone 200 perform unencrypted communication in BLE communication, and perform encrypted communication in BTC communication. This is because of the following reason.

The digital camera 100 and the smartphone 200 are also able to perform encrypted communication via both BLE communication and BTC communication. In this case, since BLE and BTC are not compatible with each other, the digital camera 100 and the smartphone 200 perform pairing processing using each of BLE and BTC and register each of connection information for BLE and connection information for BTC. However, usually, in the case of displaying a list of pieces of connection information, the smartphone 200 displays connection information about the digital camera 100 as a communication apparatus pairing with which has been performed simply in Bluetooth communication without distinguishing between BLE and BTC. Thus, on a display of the smartphone 200, the digital camera 100 would be redundantly displayed as a communication apparatus pairing with which has been performed in two Bluetooth communication. Therefore, in a case where the user confuses BLE and BTC with each other, the user may make a misunderstanding that the digital camera 100 is unnecessarily redundantly recorded in the smartphone 200 as a communication apparatus pairing with which has been performed in Bluetooth communication. For example, in a case where connection information for BTC communication has been deleted by the user due to such a misunderstanding, the digital camera 100 and the smartphone 200 need to re-perform pairing processing using BTC. In the first exemplary embodiment, to reduce the possibility of the user making a misunderstanding in the above-mentioned way, the digital camera 100 and the smartphone 200 perform encrypted communication in one of BLE communication and BTC communication and perform unencrypted communication in the other of BLE communication and BTC communication.

Moreover, in BTC communication, image data which may include personal information about the user is transmitted and received between the digital camera 100 and the smartphone 200. On the other hand, in BLE communication, for example, clock time information or GPS coordinate information, which is unlikely to be treated as personal information as compared with image data, is transmitted and received between the digital camera 100 and the smartphone 200. Thus, data to be transmitted and received in BLE communication is data lower in privacy aspect than data to be transmitted and received in BTC communication. Therefore, in the first exemplary embodiment, the digital camera 100 and the smartphone 200 perform unencrypted communication in BLE communication and perform encrypted communication in BTC communication. Thus far is the description of the reason why the digital camera 100 and the smartphone 200 perform unencrypted communication in BLE communication and perform encrypted communication in BTC communication.

<Reconnection Processing and Image Transmission Processing>

Next, an example of processing in which, after performing pairing processing illustrated in FIG. 4, the digital camera 100 and the smartphone 200 reconnect to each other via BLE is described. Moreover, an example of processing in which, in BTC communication, the digital camera 100 transmits image data to the smartphone 200 is described.

Figure 5A:
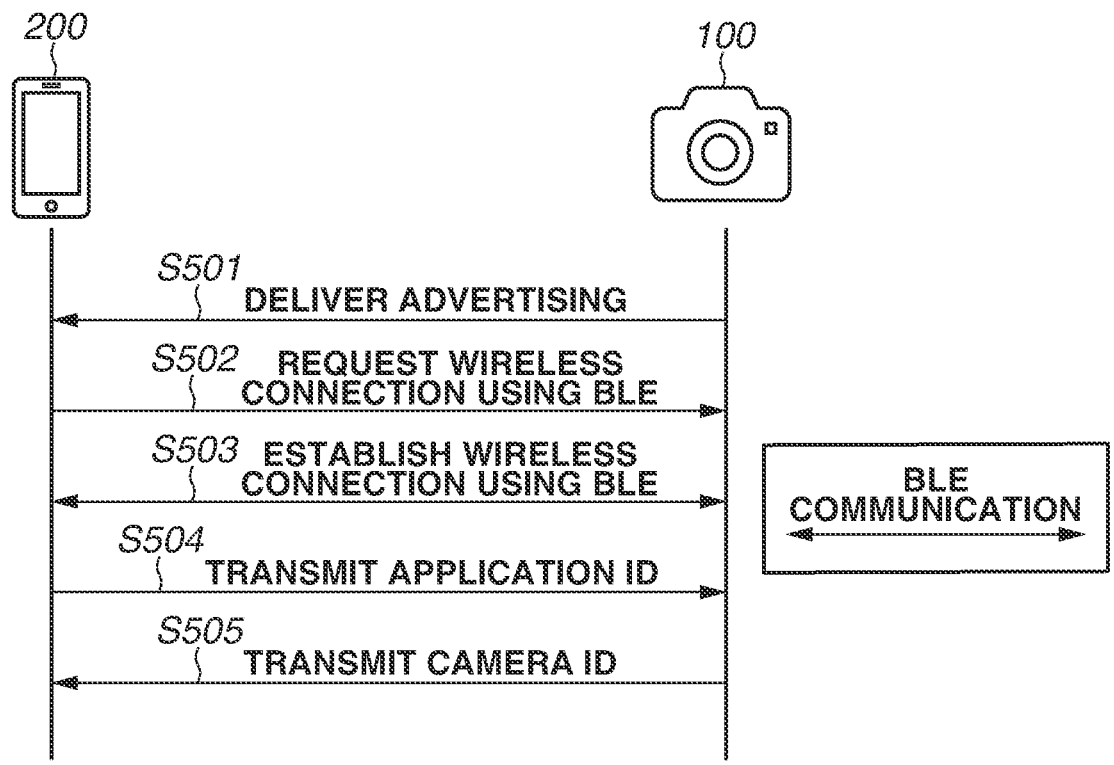
FIG. 5A is a sequence diagram illustrating an example of processing in which the digital camera and the smartphone reconnect to each other via Bluetooth Low Energy (BLE) in the first exemplary embodiment.

First, an example of processing in which the digital camera 100 and the smartphone 200, which have performed pairing with each other, connect to each other via BLE is described with reference to FIG. 5A. FIG. 5A is a sequence diagram illustrating an example of processing in which the digital camera 100 and the smartphone 200 connect to each other via BLE. Processing in the present sequence is started in response to, for example, the user turning on the power switch or wireless switch of the digital camera 100.

In step S501, the digital camera 100 delivers advertising to therearound via BLE. The advertising which the digital camera 100 delivers includes the application ID 313. The smartphone 200 receives the advertising delivered by the digital camera 100. In the present sequence, the smartphone 200 determines that the application ID 313 included in the received advertising and the ID of the communication application 322 are the same ID.

In step S502, the smartphone 200 transmits a connection request to the digital camera 100 via BLE.

In step S503, the digital camera 100 and the smartphone 200 establish BLE connection.

In step S504, the smartphone 200 transmits the application ID 313 to the digital camera 100. The digital camera 100 receives the transmitted application ID 313. Moreover, the digital camera 100 determines whether the application ID 313 received in the present step and the application ID received in the pairing processing match each other. In the present sequence, a case where the digital camera 100 determines that these application IDs match each other is illustrated as an example. Furthermore, in a case where the digital camera 100 determines that these application IDs do not match each other, the digital camera 100 disconnects a connection with the smartphone 200.

In step S505, the digital camera 100 transmits the camera ID 323 to the smartphone 200. The smartphone 200 receives the camera ID 323 from the digital camera 100.

Thus far is the description of processing in which the digital camera 100 and the smartphone 200 reconnect to each other via BLE, with reference to FIG. 5A. In and after step S505 illustrated in FIG. 5A, the digital camera 100 and the smartphone 200 maintain connection using BLE. Moreover, the digital camera 100 and the smartphone 200 transmit and receive, for example, clock time information and GPS coordinate information via BLE.

Figure 5B:
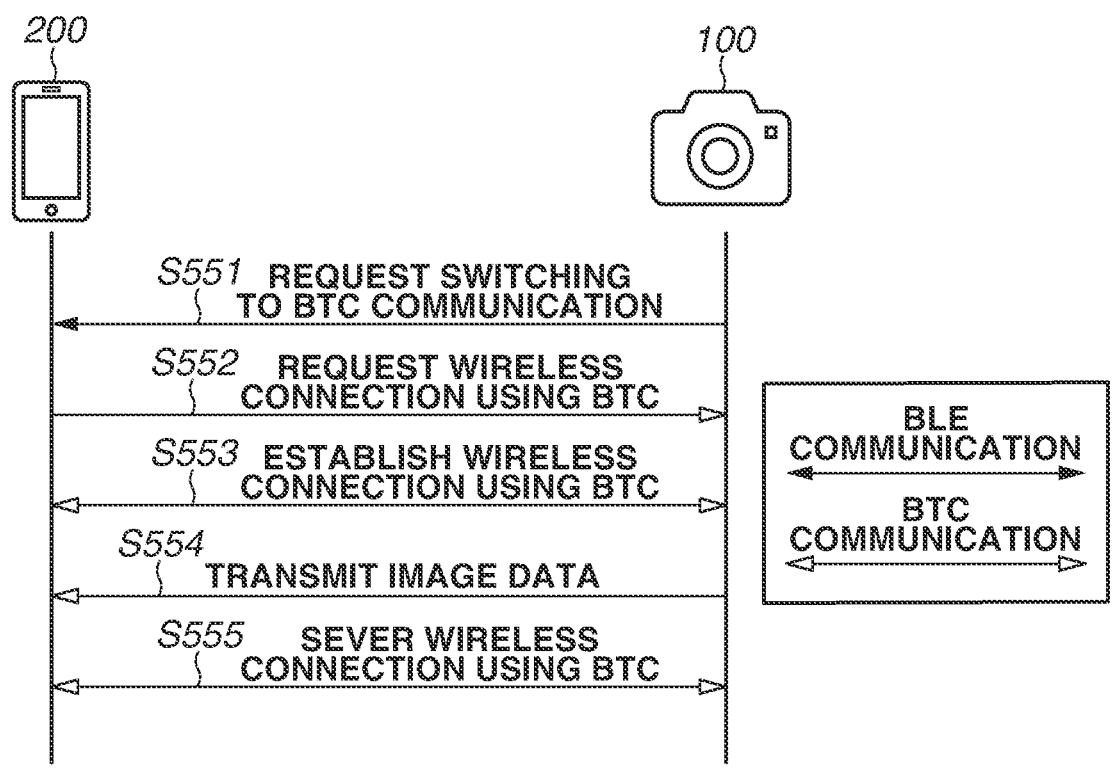
FIG. 5B is a sequence diagram illustrating an example of processing in which the digital camera transmits image data to the smartphone in the first exemplary embodiment.

Next, an example of processing in which the digital camera 100 transmits image data to the smartphone 200 via BTC is described with reference to FIG. 5B. Here, the digital camera 100 and the smartphone 200 connect to each other via BTC using a handover. Processing in the present sequence is started in response to, for example, the user operating the digital camera 100 to instruct the digital camera 100 to transmit image data. Moreover, besides, processing in the present sequence is started in a case where the digital camera 100 performs an image automatic transmission function. Furthermore, at the time of starting of the present sequence, in the first exemplary embodiment, the digital camera 100 and the smartphone 200 previously establish wireless connection by performing the connection processing using BLE illustrated in FIG. 5A.

In step S551, the digital camera 100 transmits, to the smartphone 200 via BLE communication, a packet for requesting switching to BTC communication. Moreover, the digital camera 100 transitions to a state of allowing the smartphone 200 to connect to the digital camera 100 via BTC. Furthermore, in the present step, a wireless connection using BLE between the digital camera 100 and the smartphone 200 is disconnected.

In step S552, the smartphone 200 transmits, to the digital camera 100 with use of the camera ID 323, a packet for requesting a wireless connection using BTC.

In step S553, the digital camera 100 and the smartphone 200 establish a wireless connection using BTC with use of the encryption key 325 recorded in the smartphone 200 and the encryption key 315 recorded in the digital camera 100.

In step S554, the digital camera 100 transmits image data to the smartphone 200. The digital camera 100 continues processing in the present step until the digital camera 100 has finished transmitting all of the pieces of image data to be transmitted by the image automatic transmission function or the digital camera 100 is operated by the user to cancel transmission of image data.

In step S555, the digital camera 100 and the smartphone 200 disconnect the wireless connection using BTC.

Thus far is the description of an example of processing in which the digital camera 100 and the smartphone 200 reconnect to each other via BTC. Moreover, thus far is also the description of an example of processing in which the digital camera 100 transmits image data to the smartphone 200 via BTC. In this way, the digital camera 100 uses BLE, which is lower in power consumption, in the case of maintaining connection with the smartphone 200, and uses BTC, which is higher in communication speed, in the case of transmitting image data. Additionally, for example, in the case of transmitting image data, the digital camera 100 performs a handover from BLE to BTC, thus enabling omitting a user operation required for switching connection from BLE to BTC.

<Deletion of Connection Information in Smartphone 200>

Here, one of the functions of the OS 324 of the smartphone 200 includes a Bluetooth setting function. For example, the Bluetooth setting function allows the user to check or delete connection information recorded in the smartphone 200.

Figure 6A:
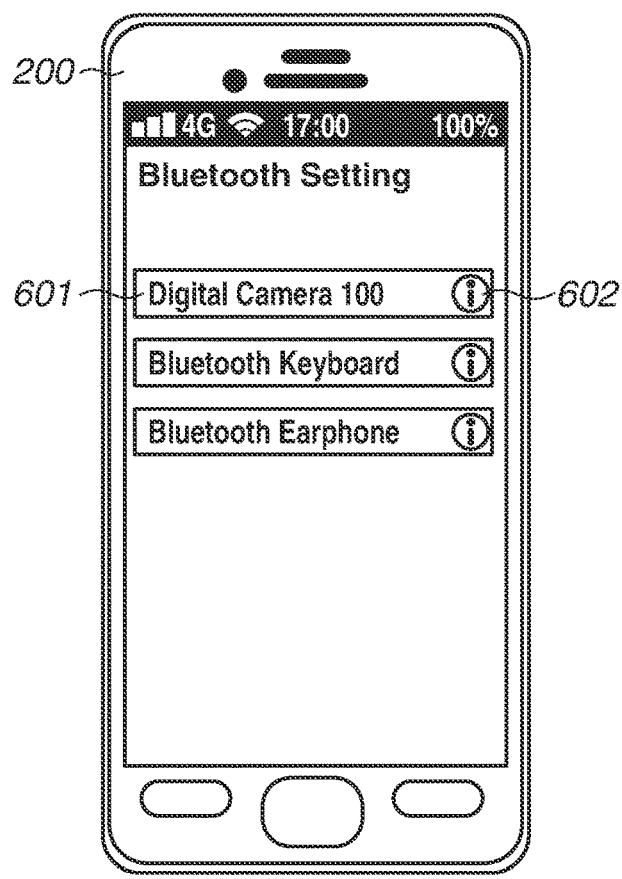
FIG. 6A illustrates an example of a screen with which the smartphone displays a list of devices with which the smartphone has currently established pairing in the first exemplary embodiment.
Figure 6B:
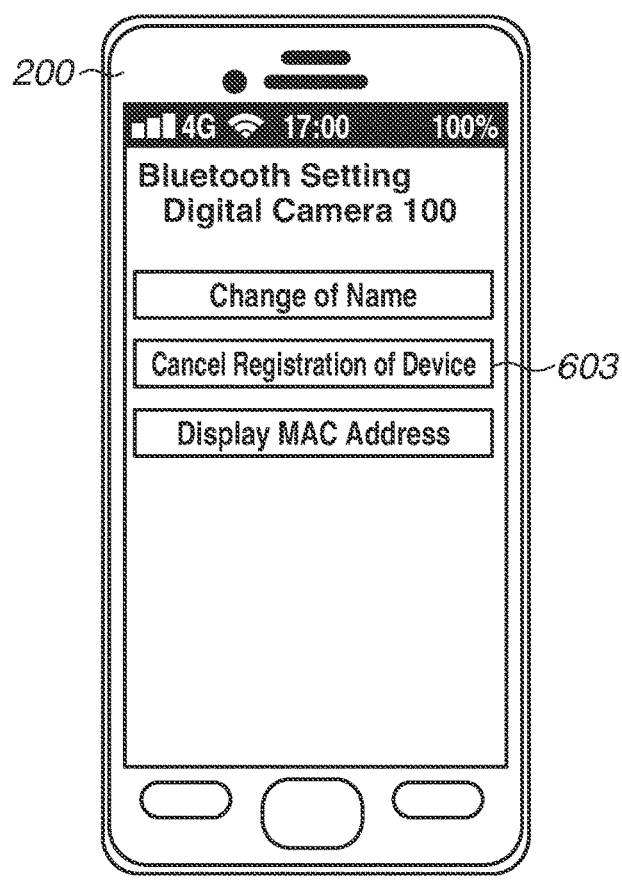
FIG. 6B illustrates an example of a screen with which the smartphone displays, for example, connection information about the digital camera in the first exemplary embodiment.

FIGS. 6A and 6B each illustrate an example of screen displaying of the smartphone 200 in a case where the Bluetooth setting function is performed by the OS 324 of the smartphone 200.

In the example illustrated in FIG. 6A, the smartphone 200 displays a list of devices pairing with which has been currently performed. In the first exemplary embodiment, the smartphone 200 displays, for example, the digital camera 100 as devices pairing with which has been performed. An item 601 shows the device name of the digital camera 100. On the right-hand side of the item 601, a detailed information button 602, which is used to display, for example, connection information and registration status about a device pairing with which has been performed, is arranged.

In a case where, for example, the user has selected the detailed information button 602, the smartphone 200 displays, for example, connection information about the digital camera 100 as illustrated in FIG. 6B. The screen illustrated in FIG. 6B enables the user to change the name of the digital camera 100 or check, for example, a MAC address of the digital camera 100. Moreover, in a case where the user has selected an item 603, the smartphone 200 deletes connection information about the digital camera 100 in BTC communication. In a case where the smartphone 200 has deleted connection information about the digital camera 100 in BTC communication, the digital camera 100 and the smartphone 200 enter a state of being unable to perform BTC communication. In this case, even if the digital camera 100 and the smartphone 200 attempt to perform a handover from BLE to BTC, the digital camera 100 and the smartphone 200 are not able to connect to each other via BTC.

Here, an example of wireless connection processing in a case where the user has performed an operation to delete connection information about the digital camera 100 recorded in the smartphone 200 is described with reference to FIGS. 7A and 7B. FIG. 7A illustrates an example of a software configuration of each of the digital camera 100 and the smartphone 200 employed for such a case. In FIG. 7A, for convenience sake, crossing out the deleted encryption key 325 indicates that the encryption key 325 has been deleted from the smartphone 200. In a case where the user has performed an operation to delete connection information with use of the function of the OS 324, the smartphone 200 deletes the encryption key 325, which is connection information for use in the OS 324. Moreover, since the camera ID 323 is data for use in the communication application 322, in a case where the user has deleted connection information from the OS 324, the smartphone 200 does not delete the camera ID 323.

FIG. 7B is a sequence diagram illustrating an example of wireless connection processing in a case where the user has deleted connection information from the OS 324. Processing in the sequence illustrated in FIG. 7B is started in response to, for example, the user operating the digital camera 100 to instruct the digital camera 100 to transmit image data via BTC. Moreover, besides, processing in the present sequence is also started in response to, for example, the user operating the digital camera 100 to start the image automatic transmission function. Furthermore, at the time of starting of the present sequence, in the first exemplary embodiment, the digital camera 100 and the smartphone 200 previously establish wireless connection by performing connection processing using BLE.

In step S701, the digital camera 100 transmits, to the smartphone 200 via BLE communication, a packet for requesting switching to BTC communication. Moreover, the digital camera 100 transitions to a state of allowing the smartphone 200 to connect to the digital camera 100 via BTC. Furthermore, in the present step, a wireless connection using BLE between the digital camera 100 and the smartphone 200 is disconnected.

In step S702, the smartphone 200 transmits, to the digital camera 100 with use of the camera ID 323, a packet for requesting a wireless connection using BTC.

In step S703, the digital camera 100 and the smartphone 200 fail in establishing a wireless connection using BTC. This is because, as described with reference to FIG. 7A, in the smartphone 200, the encryption key 325, which is required to establish a wireless connection with the digital camera 100 using BTC, has previously been deleted.

In this way, in a case where the encryption key 325 of the smartphone 200 has been deleted, it is not possible to establish a wireless connection using BTC between the digital camera 100 and the smartphone 200. To enable the digital camera 100 and the smartphone 200 to perform BTC communication again, it becomes necessary for the digital camera 100 and the smartphone 200 to perform pairing processing using BTC again.

Furthermore, wireless connection processing using BLE which is performed by the digital camera 100 and the smartphone 200 prior to the present sequence is similar to, for example, the processing in the sequence illustrated in FIG. 5A. Since connection information is not required for wireless connection using BLE, the digital camera 100 and the smartphone 200 are able to establish wireless connection via BLE without recourse to connection information for BTC.

In this way, in a case where connection information recorded in the smartphone 200 has been deleted by the function of the OS 324, the user is unable to transmit image data captured by the digital camera 100 to the smartphone 200. Particularly, in the case of transmitting image data from the digital camera 100 to the smartphone 200 with the image automatic transmission function, the user may not be able to become aware that image data has still failed to be transmitted to the smartphone 200. This is because, since this function is started in response to, for example, an operation for powering off being performed by the user, it is supposed that the user is in a state of not being using the digital camera 100, such as a state of stowing the digital camera 100 in a bag. Even if, in this state, the digital camera 100 displays an error message, the user may overlook the displayed error message. Therefore, in the first exemplary embodiment, the digital camera 100 and the smartphone 200 perform processing for causing the user to easily become aware of a state in which wireless connection is impossible.

<Warning Processing>

FIG. 8 is a sequence diagram illustrating an example of processing which the smartphone 200 performs to notify the user that connection information about the digital camera 100 is not currently recorded therein in a case where the connection information about the digital camera 100 has been deleted, in the first exemplary embodiment. Processing in the present sequence is started in response to, for example, the user turning on a power switch or wireless switch of the digital camera 100.

In step S801, the digital camera 100 delivers advertising to therearound via BLE. The advertising which the digital camera 100 delivers includes the application ID 313. The smartphone 200 receives the advertising delivered by the digital camera 100. In the present sequence, the smartphone 200 determines that the application ID 313 included in the received advertising and the ID of the communication application 322 are the same ID.

In step S802, the smartphone 200 transmits a connection request to the digital camera 100 via BLE.

In step S803, the digital camera 100 and the smartphone 200 establish BLE connection.

In step S804, the smartphone 200 transmits the application ID 313 to the digital camera 100. The digital camera 100 receives the transmitted application ID 313. The digital camera 100 compares the application ID 313 received in the present step with an application ID 313 previously recorded in the digital camera 100, and thus determines that the smartphone 200 is a smartphone pairing with which has been performed via BTC.

In step S805, the digital camera 100 transmits the camera ID 323 to the smartphone 200. The smartphone 200 receives the transmitted camera ID 323.

In step S806, the smartphone 200 determines, based on the received camera ID 323, that the digital camera 100 is a digital camera pairing with which has previously been performed via BTC. Then, the smartphone 200 determines whether connection information about the digital camera 100 is currently recorded therein. In the first exemplary embodiment, the smartphone 200 refers to the non-volatile memory 203 and determines whether the encryption key 325 is currently recorded therein. In the present sequence, the smartphone 200 determines that the encryption key 325 is not currently recorded therein. In other words, in the present step, the smartphone 200 determines that the encryption key 325 has been deleted.

Figure 9:
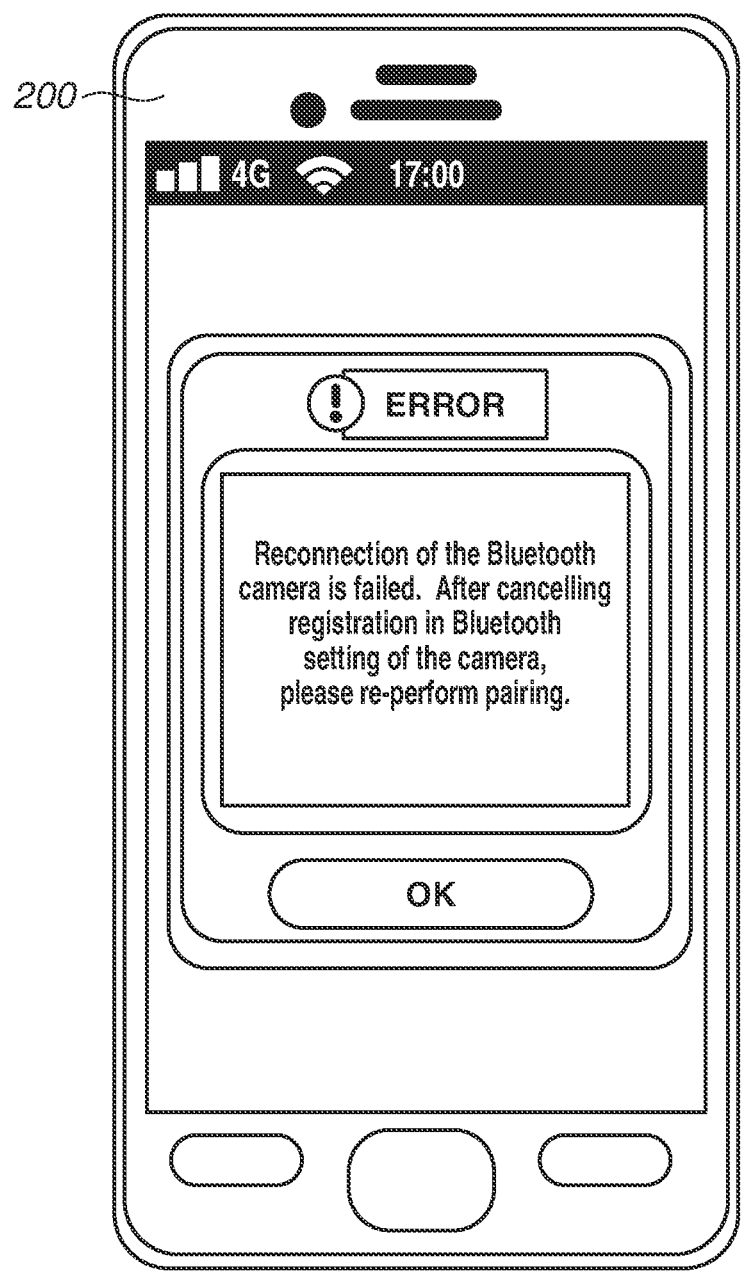
FIG. 9 illustrates an example of a warning message which the smartphone displays in the first exemplary embodiment.

In step S807, the smartphone 200 notifies the user of a message warning that connection information about the digital camera 100 is not currently recorded therein. FIG. 9 illustrates an example of a warning message which the smartphone 200 displays. The contents of the warning message include contents for prompting the user to delete connection information about a smartphone recorded in the digital camera 100 and re-perform pairing with the digital camera 100.

Thus far is the description of an example of processing which the smartphone 200 performs to notify the user that connection information about the digital camera 100 is not currently recorded therein in a case where the connection information about the digital camera 100 has been deleted. In this way, in response to connecting to the digital camera 100 via BLE, the smartphone 200 determines whether connection information for BTC is currently recorded therein, so that the user becomes easily aware of a state in which BTC communication is not able to be used.

On the other hand, in a case where the user has performed an operation to delete connection information with use of the function of the communication application 322, the smartphone 200 deletes the connection information and identification information. In the first exemplary embodiment, in this case, the smartphone 200 deletes the encryption key 325 and the camera ID 323. In this case, when establishing wireless connection with the digital camera 100 via BLE, the smartphone 200 is able to determine, based on the camera ID 323 not being currently recorded therein, that the connection information has been deleted. Therefore, when establishing wireless connection with the digital camera 100 via BLE, the smartphone 200 is able to notify the user of a warning. Thus, the warning processing such as that illustrated in FIG. 8 is processing which particularly brings about an advantageous effect in a case where the user has deleted connection information with use of the function of the OS 324 of the smartphone 200.

<Operation of Digital Camera 100>

A series of wireless connection processing operations of the digital camera 100 in the first exemplary embodiment is described with reference to FIG. 10 to FIG. 12.

Figure 10:
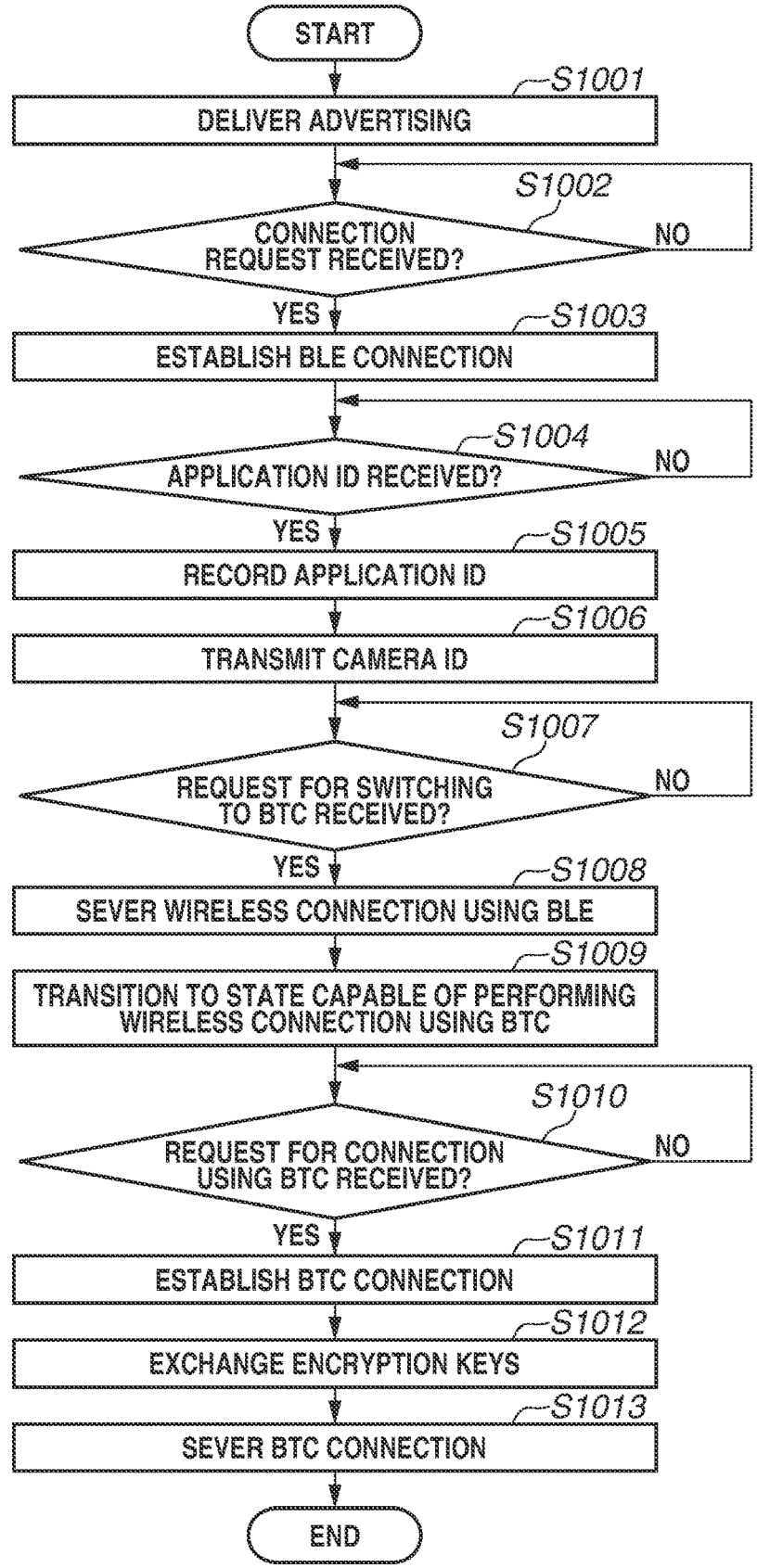
FIG. 10 is a flowchart illustrating an example of processing in which the digital camera performs pairing with the smartphone in the first exemplary embodiment.

FIG. 10 is a flowchart illustrating an example of processing in which the digital camera 100 performs pairing with the smartphone 200. The present processing is implemented by the control unit 101 loading a program recorded on the non-volatile memory 103 onto the working memory 104 and executing the program. Processing in the present flowchart is started in response to, as a trigger, an instruction for starting pairing being issued by the user via the operation unit 105.

In step S1001, the control unit 101 delivers advertising using BLE via the first near field wireless unit 112a. The advertising includes, for example, the device name, camera ID 323, and service ID of the digital camera 100. Processing in the present step is equivalent to, for example, processing in step S401 illustrated in FIG. 4.

In step S1002, the control unit 101 waits until reception of a connection request made in response to the advertising transmitted in step S1001. If it is determined that the connection request has been received (YES in step S1002), the processing proceeds to step S1003. In the first exemplary embodiment, the control unit 101 receives the connection request from the smartphone 200. Processing in the present step is equivalent to, for example, processing in step S402 illustrated in FIG. 4.

In step S1003, the control unit 101 establishes wireless connection with the smartphone 200 using BLE via the first near field wireless unit 112a. Processing in the present step is equivalent to, for example, processing in step S403 illustrated in FIG. 4.

In step S1004, the control unit 101 waits until reception of the application ID 313 from the smartphone 200 via the first near field wireless unit 112a. If it is determined that the application ID 313 has been received (YES in step S1004), the processing proceeds to step S1005. Processing in the present step is equivalent to, for example, processing in step S404 illustrated in FIG. 4.

In step S1005, the control unit 101 records, on the non-volatile memory 103, the application ID 313 as data which is to be used in the camera control module 312.

In step S1006, the control unit 101 transmits the camera ID 323 to the smartphone 200 via the first near field wireless unit 112a. For example, the camera ID 323 includes a MAC address in BTC communication of the digital camera 100 and an ID allocated by the OS 324. Processing in the present step is equivalent to, for example, processing in step S405 illustrated in FIG. 4.

In step S1007, the control unit 101 waits until reception of a packet for requesting switching to BTC communication from the smartphone 200 via the first near field wireless unit 112a. Upon receiving this request packet, the control unit 101 starts wireless connection processing using BTC. Moreover, if it is determined that the request packet has been received (YES in step S1007), the processing proceeds to step S1008. Processing in the present step is equivalent to, for example, processing in step S406 illustrated in FIG. 4.

In step S1008, the control unit 101 disconnects wireless connection with the smartphone 200 performed via BLE. Processing in the present step is equivalent to, for example, processing in step S407 illustrated in FIG. 4.

In step S1009, the control unit 101 controls the second near field wireless unit 112b in such a way as to enable the smartphone 200 to perform wireless connection therewith via BTC.

In step S1010, the control unit 101 waits until reception of a packet for requesting wireless connection using BTC from the smartphone 200 via the second near field wireless unit 112b. If it is determined that the request packet has been received (YES in step S1010), the processing proceeds to step S1011. Processing in the present step is equivalent to, for example, processing in step S408 illustrated in FIG. 4.

In step S1011, the control unit 101 establishes wireless connection with the smartphone 200 using BTC via the second near field wireless unit 112b. Processing in the present step is equivalent to, for example, processing in step S409 illustrated in FIG. 4.

In step S1012, the control unit 101 exchanges encryption keys used for performing encrypted communication using BTC communication with the smartphone 200. In the present step, the control unit 101 records the encryption key 315 on the non-volatile memory 103. The encryption key 315 is data which is to be used in the communication control module 314. Processing in the present step is equivalent to, for example, processing in step S409 illustrated in FIG. 4.

In step S1013, the control unit 101 disconnects the wireless connection using BTC with the smartphone 200. Processing in the present step is equivalent to, for example, processing in step S410 illustrated in FIG. 4.

Thus far is the description of an example of processing in which the digital camera 100 and the smartphone 200 perform pairing with each other.

Figure 11:
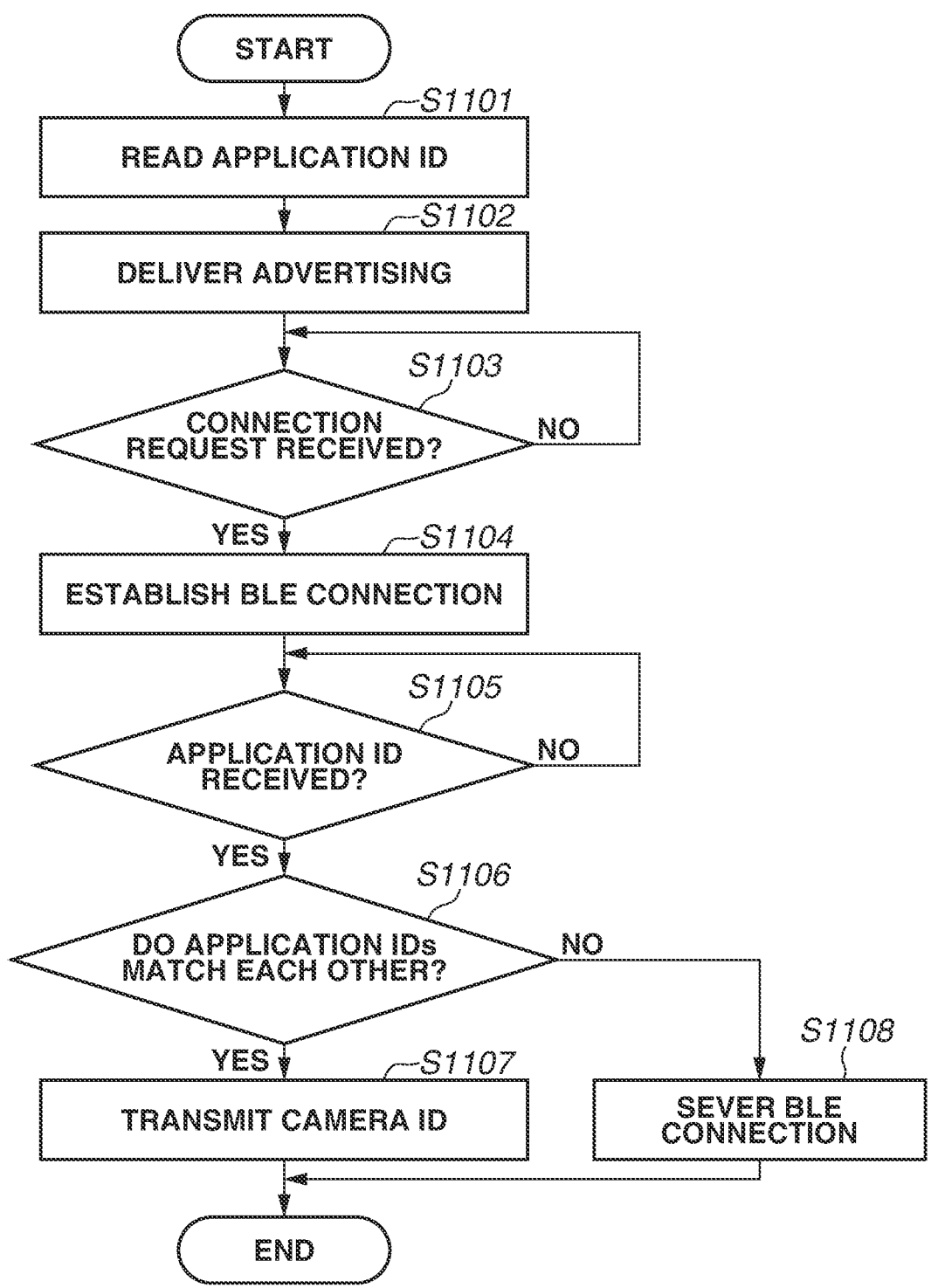
FIG. 11 is a flowchart illustrating an example of processing in which the digital camera reconnects to the smartphone via BLE in the first exemplary embodiment.

FIG. 11 is a flowchart illustrating an example of processing in which the digital camera 100 performs reconnection using BLE with the smartphone 200. The present processing is implemented by the control unit 101 loading a program recorded on the non-volatile memory 103 onto the working memory 104 and executing the program. Processing in the present flowchart is started, for example, in response to, as a trigger, the user operating the operation unit 105 to power on the digital camera 100.

In step S1101, the control unit 101 reads the application ID 313 recorded on the non-volatile memory 103.

In step S1102, the control unit 101 delivers advertising using BLE via the first near field wireless unit 112a. The advertising includes the application ID 313 read by the control unit 101 in step S1101. Processing in the present step is equivalent to, for example, processing in step S501 illustrated in FIG. 5A.

In step S1103, the control unit 101 waits until reception of a connection request packet issued in response to the advertising delivered in step S1102. In the first exemplary embodiment, the connection request packet is transmitted by the smartphone 200. If it is determined by the control unit 101 that the connection request packet has been received (YES in step S1103), the processing proceeds to step S1104. Processing in the present step is equivalent to, for example, processing in step S502 illustrated in FIG. 5A.

In step S1104, the control unit 101 establishes BLE connection with the smartphone 200 via the first near field wireless unit 112a. Processing in the present step is equivalent to, for example, processing in step S503 illustrated in FIG. 5A.

In step S1105, the control unit 101 waits until reception of an application ID from the smartphone 200 via the first near field wireless unit 112a. If it is determined by the control unit 101 that the application ID has been received (YES in step S1105), the processing proceeds to step S1106. Processing in the present step is equivalent to, for example, processing in step S504 illustrated in FIG. 5A.

In step S1106, the control unit 101 determines whether the application ID received in step S1105 matches the application ID 313. If it is determined by the control unit 101 that both application IDs match each other (YES in step S1106), the processing proceeds to step S1107. If it is determined by the control unit 101 that both application IDs do not match each other (NO in step S1106), the processing proceeds to step S108.

In step S1107, the control unit 101 determines that the device which has transmitted the connection request packet is the smartphone 200, and transmits the camera ID 323 to the smartphone 200 via the first near field wireless unit 112a. Processing in the present step is equivalent to, for example, processing in step S505 illustrated in FIG. 5A.

In step S1108, the control unit 101 determines that the device which has transmitted the connection request packet is not the smartphone 200, and disconnects the BLE connection.

Thus far is the description of an example of processing in which the digital camera 100 performs reconnection with the smartphone 200.

Figure 12:
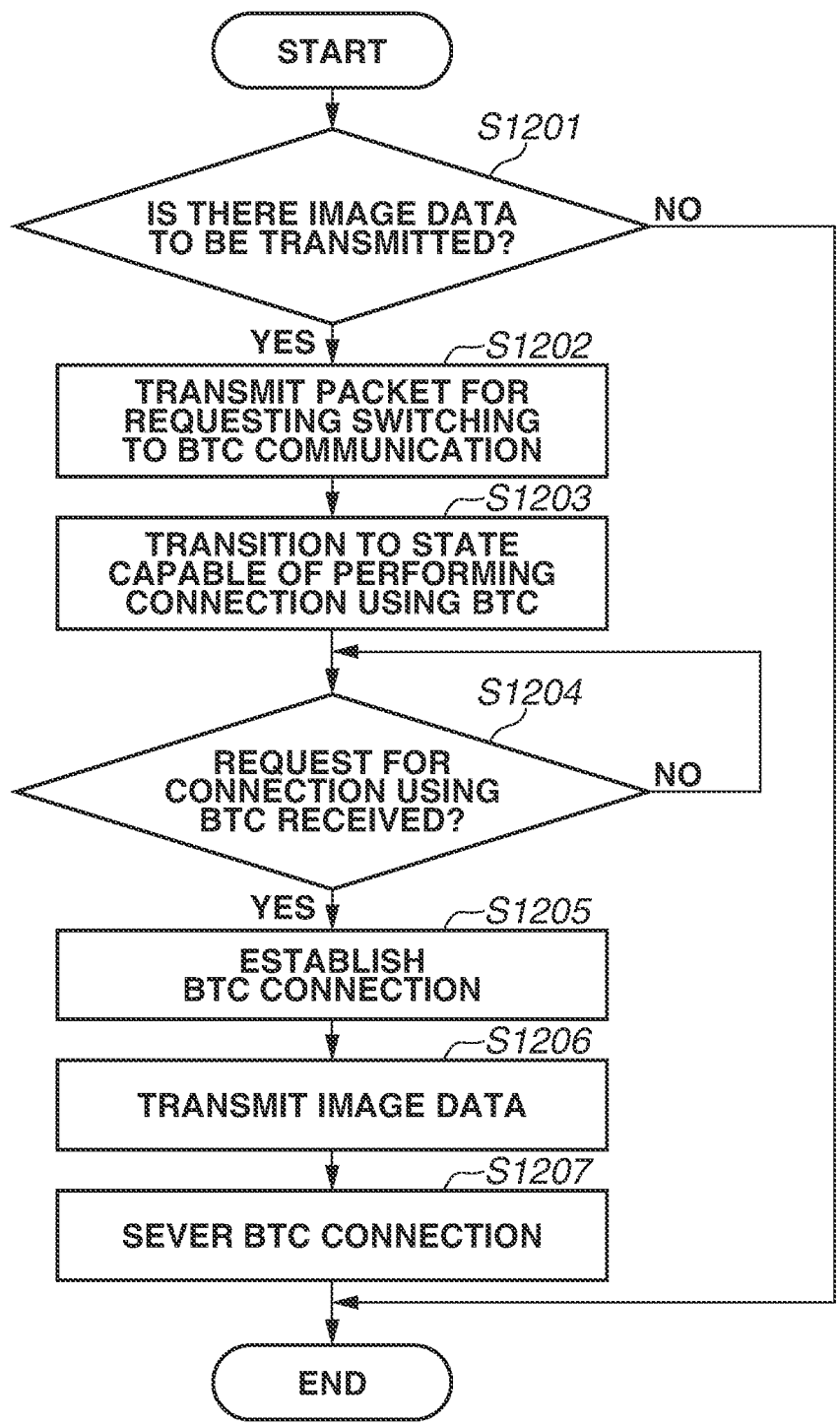
FIG. 12 is a flowchart illustrating an example of processing in which the digital camera transmits image data to the smartphone in the first exemplary embodiment.

FIG. 12 is a flowchart illustrating an example of processing in which the digital camera 100 transmits image data to the smartphone 200. The present processing is implemented by the control unit 101 loading a program recorded on the non-volatile memory 103 onto the working memory 104 and executing the program. Processing in the present flowchart is started, for example, in response to, as a trigger, the user operating the operation unit 105 to power on the digital camera 100. Processing in the present flowchart is started, for example, in response to the user operating the operation unit 105 to instruct the digital camera 100 to transmit image data. Moreover, besides, processing in the present flowchart is started, for example, in a case where the control unit 101 performs the image automatic transmission function. Furthermore, at the time of starting of the present flowchart, in the first exemplary embodiment, the digital camera 100 and the smartphone 200 previously establish wireless connection using BLE.

In step S1201, the control unit 101 determines whether there is image data which is a target to be transmitted to the smartphone 200. The image data includes, for example, image data recorded on the recording medium 110 and image data recorded on the non-volatile memory 103 and not yet transmitted to the smartphone 200. Moreover, for example, the control unit 101 determines whether there is image data to be transmitted to the smartphone 200 based on management information about image data recorded in the digital camera 100. If it is determined by the control unit 101 that there is image data to be transmitted to the smartphone 200 (YES in step S201), the processing proceeds to step S1202. If it is determined by the control unit 101 that there is no image data to be transmitted to the smartphone 200 (NO in step S1201), the processing ends.

In step S1202, the control unit 101 transmits a packet for requesting switching to BTC communication to the smartphone 200 via the first near field wireless unit 112a. Processing in the present step is equivalent to, for example, processing in step S551 illustrated in FIG. 5B.

In step S1203, the control unit 101 controls the second near field wireless unit 112b in such a way as to enter a state of being able to perform connection using BTC. Processing in the present step is equivalent to, for example, processing in step S551 illustrated in FIG. 5B.

In step S1204, the control unit 101 receives a packet for requesting wireless connection using BTC via the second near field wireless unit 112b. Here, the control unit 101 determines that the transmission source is the smartphone 200 based on the camera ID 323 included in the received request packet. Processing in the present step is equivalent to, for example, processing in step S552 illustrated in FIG. 5B.

In step S1205, the control unit 101 establishes wireless connection using BTC via the second near field wireless unit 112b with use of the encryption key 315 recorded on the non-volatile memory 103 of the digital camera 100. Processing in the present step is equivalent to, for example, processing in step S553 illustrated in FIG. 5B.

In step S1206, the control unit 101 transmits image data to the smartphone 200 using BTC via the second near field wireless unit 112b. For example, the control unit 101 ends transmission of image data in response to transmission of all of the pieces of image data to be transmitted to the smartphone 200 being completed or a cancel operation being received via the operation unit 105. Processing in the present step is equivalent to, for example, processing in step S554 illustrated in FIG. 5B.

In step S1207, the control unit 101 disconnects the wireless connection using BTC with the smartphone 200, and then ends the processing. Processing in the present step is equivalent to, for example, processing in step S555 illustrated in FIG. 5B.

Thus far is the description of an example of processing in which the digital camera 100 transmits image data to the smartphone 200.

<Operation of Smartphone 200>

Figure 13:
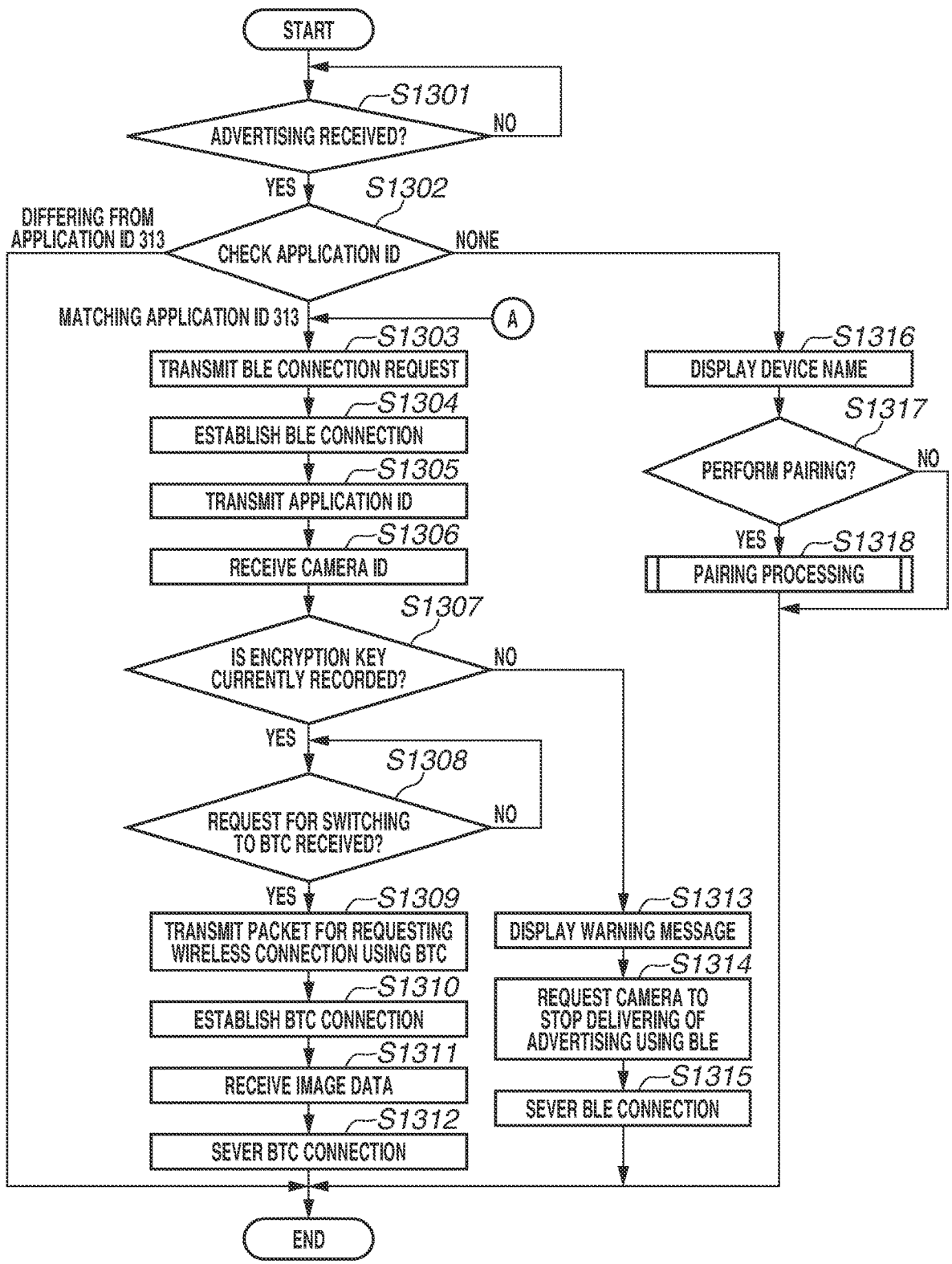
FIG. 13 is a flowchart illustrating an example of an operation of the smartphone in the first exemplary embodiment.

An operation of the smartphone 200 in the first exemplary embodiment is described. FIG. 13 is a flowchart illustrating an example of an operation of the smartphone 200 in the first exemplary embodiment. The present processing is implemented by the control unit 201 loading a program recorded on the non-volatile memory 203 onto the working memory 204 and executing the program. Processing in the present flowchart is started in response to, for example, the control unit 201 activating the communication application 322.

In step S1301, the control unit 201 determines whether advertising has been received via the first near field wireless unit 212a by the function of the OS 324. If it is determined by the control unit 201 that advertising has been received (YES in step S1301), information included in the advertising is communicated from the OS 324 to the communication application 322, and the processing proceeds to step S1302.

In step S1302, the control unit 201 determines whether an application ID is included in the advertising received in step S1301. Moreover, if an application ID is included in the advertising, the control unit 201 determines whether the application ID matches the application ID 313. Processing in the present step is implemented by the control unit 201 operating according to the communication application 322.

If it is determined by the control unit 201 that no application ID is included in the advertising (NONE in step S1302), the processing proceeds to step S1316. If it is determined by the control unit 201 that the application ID included in the advertising differs from the application ID 313 (DIFFERING FROM APPLICATION ID 313 in step S1302), the processing ends. If it is determined by the control unit 201 that the application ID included in the advertising matches the application ID 313 (MATCHING APPLICATION ID 313 in step S1302), the processing proceeds to step S1303. First, a case where the control unit 201 has determined that the application ID included in the advertising matches the application ID 313 is described.

In step S1303, according to the communication application 322, the control unit 201 requests the OS 324 to transmit, via the first near field wireless unit 212a, a connection request in response to the advertising received in step S1301. With this processing, a connection request is transmitted via the first near field wireless unit 212a under the control of the OS 324. Processing in the present step is equivalent to, for example, processing in step S502 illustrated in FIG. 5A.

In step S1304, the control unit 201 establishes BLE connection with the digital camera 100 via the first near field wireless unit 212a according to the function of the OS 324. Processing in the present step is equivalent to, for example, processing in step S503 illustrated in FIG. 5A.

In step S1305, according to the communication application 322, the control unit 201 requests the OS 324 to transmit, via the first near field wireless unit 212a, the application ID 313 to the digital camera 100. With this processing, the application ID 313 is transmitted to the digital camera 100 via the first near field wireless unit 212a under the control of the OS 324. Processing in the present step is equivalent to, for example, processing in step S504 illustrated in FIG. 5A.

In step S1306, the control unit 201 receives the camera ID 323 from the digital camera 100 via the first near field wireless unit 212a according to the function of the OS 324. Processing in the present step is equivalent to, for example, processing in step S505 illustrated in FIG. 5A. Furthermore, the camera ID 323 received in the present step is previously retained by the communication application 322 as long as pairing has previously been performed. Therefore, for example, the control unit 201 can determine whether the previously retained information and the camera ID 323 received in the present step match each other, and, if those do not match each other, the control unit 201 can determine that the digital camera 100 is not an appropriate communication partner and then disconnect the communication performed via the first near field wireless unit 212a in the present step. In that case, processing in the present flowchart ends. On the other hand, if those match each other, the processing proceeds to step S1307.

In step S1307, the control unit 201 determines, according to the communication application 322, whether the encryption key 325, which is to be used in BTC communication with the digital camera 100, is currently recorded on the non-volatile memory 203. For example, the control unit 201 inquires of the OS 324 whether the encryption key 325 corresponding to the camera ID 323 received in step S1306 is currently recorded. In response to this inquiry, the OS 324 makes a reply to the communication application 322. Upon receiving the reply, the communication application 322 recognizes whether the encryption key 325 corresponding to the camera ID 323 received in step S1306 is currently recorded. If it is determined by the control unit 201 that the encryption key 325 is currently recorded (YES in step S1307), the processing proceeds to step S1308. If it is determined by the control unit 201 that the encryption key 325 is not currently recorded (NO in step S1307), the processing proceeds to step S1313. Firstly, a case where the control unit 201 has determined that the encryption key 325 is currently recorded is described.

In step S1308, the control unit 201 determines, according to the communication application 322, whether a packet for requesting switching to BTC communication has been received from the digital camera 100 via the first near field wireless unit 212a. Furthermore, according to the OS 324, the content of the packet for BLE received via the first near field wireless unit 212a is communicated from the OS 324 to the communication application 322. If it is determined that the packet has not yet been received (NO in step S1308), the control unit 201 waits until reception of a packet for requesting switching to BTC communication. If it is determined by the control unit 201 that the packet for requesting switching to BTC communication has been received (YES in step S1308), the processing proceeds to step S1309. Processing in the present step is equivalent to, for example, processing in step S551 illustrated in FIG. 5B.

In step S1309, according to the communication application 322, the control unit 201 requests the OS 324 to transmit a packet for requesting wireless connection using BTC to the digital camera 100 via the second near field wireless unit 212b. With this processing, the packet for requesting wireless connection is transmitted to the digital camera 100 via the second near field wireless unit 212b under the control of the OS 324. In the first exemplary embodiment, the control unit 201 transmits this packet with the camera ID 323 included therein. Processing in the present step is equivalent to, for example, processing in step S552 illustrated in FIG. 5B.

In step S1310, the control unit 201 establishes a wireless connection using BTC with the digital camera 100 via the second near field wireless unit 212b according to the function of the OS 324. Here, the control unit 201 uses the encryption key 325 to establish a wireless connection using BTC. Processing in the present step is equivalent to, for example, processing in step S553 illustrated in FIG. 5B.

In step S1311, the control unit 201 receives image data from the digital camera 100 via the second near field wireless unit 212b according to the communication application 322 and the function of the OS 324. In the present step, in a case where a plurality of pieces of image data is transmitted from the digital camera 100, the control unit 201 receives all of the transmitted plurality of pieces of image data. Processing in the present step is equivalent to, for example, processing in step S554 illustrated in FIG. 5B.

In step S1312, according to the communication application 322, the control unit 201 requests the OS 324 to disconnect a wireless connection using BTC with the digital camera 100 and then end the processing. With this processing, the wireless connection using BTC is disconnected under the control of the OS 324. Processing in the present step is equivalent to, for example, processing in step S555 illustrated in FIG. 5B.

Moreover, a case where, in step S1307, the control unit 201 has determined that the encryption key 325 is not currently recorded is described.

In step S1313, the control unit 201 issues a notification about a warning message on the display unit 206 according to the communication application 322. For example, the control unit 201 displays a warning message such as that illustrated in FIG. 9. In the first exemplary embodiment, the control unit 201 causes the content for prompting re-performing a pairing operation to be included in the warning message, as illustrated in FIG. 9.

In step S1314, according to the communication application 322, the control unit 201 requests the OS 324 to transmit, via the second near field wireless unit 212b, a request packet for stopping delivery of advertising for reconnection using BLE. With this processing, the request packet for stopping delivery of advertising is transmitted to the digital camera 100 via the second near field wireless unit 212b under the control of the OS 324. As a result, the digital camera 100 is controlled in such a way as not to deliver advertising after BLE connection is disconnected. With this processing, since, in step S1315 and subsequent steps, the digital camera 100 does not deliver advertising for reconnection using BLE, it is possible to reduce power consumption of the digital camera 100. Processing in the present step can be performed in parallel with step S1313.

In step S1315, according to the communication application 322, the control unit 201 requests the OS 324 to disconnect the BLE connection with the digital camera 100. With this processing, BLE connection is disconnected under the control of the OS 324. After that, the processing ends.

Next, a case where, in step S1302, the control unit 201 has determined that no application ID is included in the advertising is described. In the first exemplary embodiment, the device which has transmitted this advertising is assumed to be the digital camera 100. In a case where no application ID is included in the advertising, the control unit 201 determines that pairing with the digital camera 100 has not been performed.

In step S1316, the control unit 201 displays the device name of the device which has transmitted the advertising on the display unit 206 according to the communication application 322. In the first exemplary embodiment, the control unit 201 displays the identification name of the digital camera 100 on the display unit 206.

In step S1317, according to the communication application 322, the control unit 201 receives, via the operation unit 205, a user operation for issuing an instruction as to whether to perform pairing with the digital camera 100. If the control unit 201 has been instructed by the user to perform pairing (YES in step S1317), the processing proceeds to step S1318. If the control unit 201 has been instructed by the user not to perform pairing (NO in step S1317), the processing ends.

In step S1318, according to the communication application 322, the control unit 201 requests the OS 324 to start pairing processing with the digital camera 100. With this processing, pairing processing is started under the control of the OS 324. Pairing processing is described below.

Thus far is the description of an example of an operation of the smartphone 200.

Furthermore, in step S1302, when detecting that a value indicating that no application ID is included in the advertising is included in the advertising, the control unit 201 can determine that no application ID is included in the advertising.

Furthermore, in step S1313, in addition to displaying a warning message, the control unit 201 can transmit, to the digital camera 100, a packet for requesting the digital camera 100 to display a warning message. Upon receiving this packet, the digital camera 100 displays a warning message such as that illustrated in FIG. 9. This enables the user to also become aware of the warning message displayed on the digital camera 100.

Furthermore, in step S1313, without displaying the warning message, the control unit 201 can also request the digital camera 100 to re-perform pairing processing. In this case, after deleting connection information about the smartphone 200 recorded on the non-volatile memory 103, the digital camera 100 starts pairing processing with the smartphone 200 again.

Here, pairing processing which is performed by the smartphone 200 is described. This processing is equivalent to processing in step S1318 illustrated in FIG. 13. FIG. 14 is a flowchart illustrating an example of processing in which the smartphone 200 performs pairing with the digital camera 100. The present processing is implemented by the control unit 201 loading a program recorded on the non-volatile memory 203 onto the working memory 204 and executing the program. Processing in the present sequence is started in response to, for example, an instruction for starting pairing being received from the user via the operation unit 205.

In step S1401, according to the communication application 322, the control unit 201 requests the OS 324 to transmit a connection request to the digital camera 100 via the first near field wireless unit 212a. With this processing, the connection request is transmitted to the digital camera 100 via the first near field wireless unit 212a under the control of the OS 324. Processing in the present step is equivalent to, for example, processing in step S402 illustrated in FIG. 4.

In step S1402, the control unit 201 establishes BLE connection with the digital camera 100 via the first near field wireless unit 212a according to the OS 324. Processing in the present step is equivalent to, for example, processing in step S403 illustrated in FIG. 4.

In step S1403, the control unit 201 transmits the application ID 313 of the communication application 322 to the digital camera 100 via the first near field wireless unit 212a according to the communication application 322. Processing in the present step is equivalent to, for example, processing in step S404 illustrated in FIG. 4.

In step S1404, according to the communication application 322, the control unit 201 determines whether a camera ID has been received from the digital camera 100 via the first near field wireless unit 212a. The control unit 201 waits until reception of a camera ID. If it is determined by the control unit 201 that a camera ID has been received (YES in step S1404), the processing proceeds to step S1405. Processing in the present step is equivalent to, for example, processing in step S405 and step S406 illustrated in FIG. 4.

In step S1405, the control unit 201 records the camera ID 323 received in step S1404 on the non-volatile memory 203 according to the communication application 322 and the OS 324.

In step S1406, according to the communication application 322, the control unit 201 requests the OS 324 to transmit a request packet for requesting switching to BTC communication to the digital camera 100 via the first near field wireless unit 212a. With this processing, a request packet for requesting switching to BTC communication is transmitted to the digital camera 100 under the control of the OS 324. Processing in the present step is equivalent to, for example, processing in step S406 illustrated in FIG. 4.

In step S1407, according to the communication application 322, the control unit 201 requests the OS 324 to disconnect the BLE connection with the digital camera 100. With this processing, BLE connection is disconnected under the control of the OS 324. Processing in the present step is equivalent to, for example, processing in step S407 illustrated in FIG. 4.

In step S1408, according to the communication application 322, the control unit 201 requests the OS 324 to transmit a packet for requesting a wireless connection using BTC with the digital camera 100 via the second near field wireless unit 212b. With this processing, a packet for requesting a wireless connection using BTC is transmitted under the control of the OS 324. The control unit 201 causes the camera ID received in step S1404 to be included in the packet. Processing in the present step is equivalent to, for example, processing in step S408 illustrated in FIG. 4.

In step S1409, the control unit 201 establishes a wireless connection using BTC with the digital camera 100 via the second near field wireless unit 212b according to the OS 324. Processing in the present step is equivalent to, for example, processing in step S409 illustrated in FIG. 4.

In step S1410, according to the communication application 322 and the OS 324, the control unit 201 receives the encryption key 325 from the digital camera 100 via the second near field wireless unit 212b. The control unit 201 records the encryption key 325 on the non-volatile memory 203. Processing in the present step is equivalent to, for example, processing in step S409 illustrated in FIG. 4.

In step S1411, according to the communication application 322, the control unit 201 requests the OS 324 to disconnect the BTC connection with the digital camera 100. With this processing, BTC connection is disconnected under the control of the OS 324. After that, the processing ends. Processing in the present step is equivalent to, for example, processing in step S410 illustrated in FIG. 4.

Thus far is the description of an example of pairing processing which is performed by the smartphone 200.

Thus far is the description of the first exemplary embodiment. In the first exemplary embodiment, in a case where the smartphone 200 has established a connection using BLE with the digital camera 100 in a state in which an encryption key for BTC has been deleted, the smartphone 200 displays a warning message for prompting re-performing pairing with the digital camera 100. This enables the user to become aware that a discrepancy is occurring between connection information which is currently recorded in the smartphone 200 and connection information which is currently recorded in the digital camera 100.

In the first exemplary embodiment, an example of a method in which, in a case where pairing with the digital camera 100 has been cancelled in the smartphone 200, the smartphone 200 displays a warning to the user has been described. In a second exemplary embodiment, an example of a method in which, in a case where the user has cancelled pairing with the smartphone 200 in the digital camera 100, the digital camera 100 displays a warning is described.

In the second exemplary embodiment, a configuration of the digital camera 100, a configuration of the smartphone 200, and a system configuration are similar to those in the first exemplary embodiment.

The user is allowed to delete connection information about the smartphone 200 pairing with which has been performed, by operating a communication setting menu of the digital camera 100.

Figure 15A:
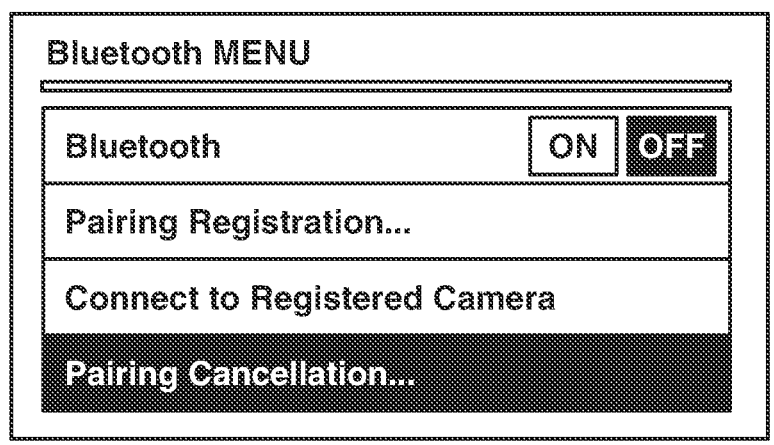
FIG. 15A illustrates an example of a screen for a communication setting menu which the digital camera displays in a second exemplary embodiment.
Figure 15B:
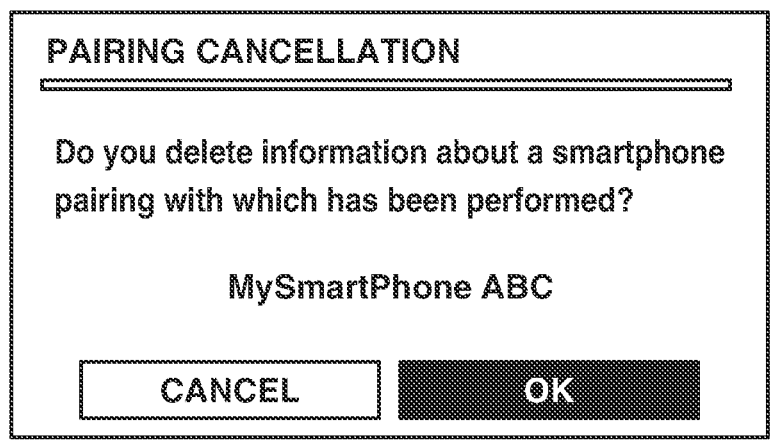
FIG. 15B illustrates an example of a pairing cancellation screen which the digital camera displays in the second exemplary embodiment.

FIG. 15A illustrates an example of a screen for a communication setting menu displayed on the display unit 106 of the digital camera 100. In this screen, the digital camera 100 displays an item for pairing registration and an item for pairing cancellation. In a case where the user has selected the item for pairing cancellation with use of the operation unit 105, the digital camera 100 displays a pairing cancellation screen such as that illustrated in FIG. 15B. The user checks information about the smartphone 200 pairing with which has been performed on the pairing cancellation screen and is allowed to cancel pairing with the smartphone 200. On the other hand, in the second exemplary embodiment, connection information about the digital camera 100 is assumed to be currently recorded in the smartphone 200.

Figure 16A:
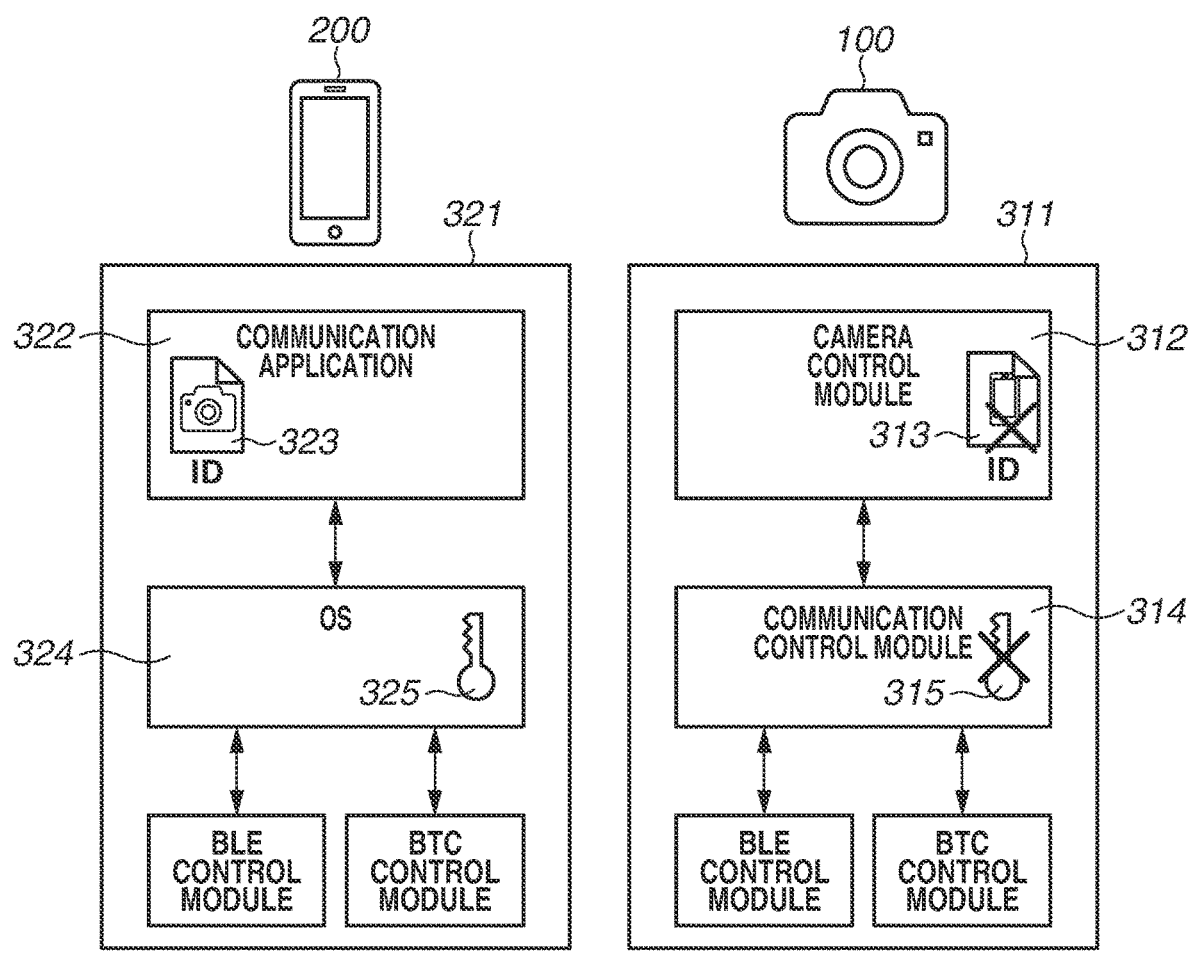
FIG. 16A is an example of a software configuration diagram of each of the digital camera and the smartphone in a case where the user has deleted connection information about the smartphone recorded in the digital camera in the second exemplary embodiment.

Here, an example of wireless connection processing which is performed in a case where the user has deleted connection information about the smartphone 200 recorded in the digital camera 100 is described with reference to FIGS. 16A and 16B. FIG. 16A illustrates an example of a software configuration of each of the digital camera 100 and the smartphone 200 in this case. In FIG. 16A, for convenience sake, crossing out the deleted application ID 313 and encryption key 315 indicates that the application ID 313 and the encryption key 315 have been deleted from the digital camera 100.

Figure 16B:
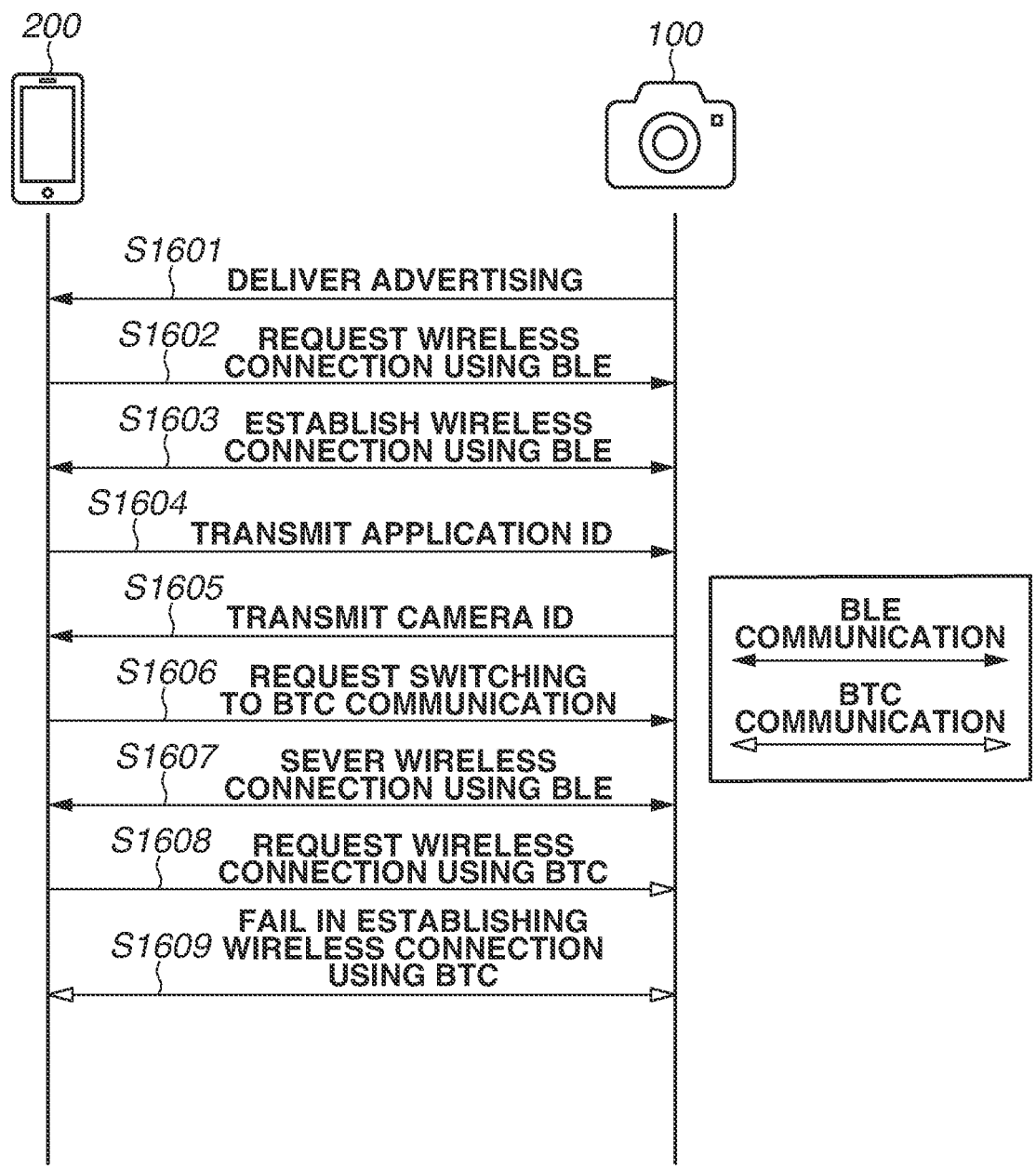
FIG. 16B is a sequence diagram illustrating an example of BLE connection processing performed in a case where the user has deleted connection information about the smartphone recorded in the digital camera in the second exemplary embodiment.

FIG. 16B is a sequence diagram illustrating an example of BLE connection processing which is performed in this case. Processing in the sequence illustrated in FIG. 16B is started in response to, for example, the user operating the digital camera 100 to instruct the digital camera 100 to transmit image data via BTC. Moreover, besides, processing in the present sequence is started in response to, for example, the user operating the digital camera 100 to start an image automatic transmission function.

In step S1601, the digital camera 100 delivers advertising for requesting pairing to therearound via BLE. The smartphone 200 receives the delivered advertising.

In step S1602, the smartphone 200 requests the digital camera 100 to perform a wireless connection using BLE. For example, in a case where the smartphone 200 has received, from the user, an operation for issuing an instruction for starting pairing with the digital camera 100, the smartphone 200 transmits a connection request to the digital camera 100. The digital camera 100 receives the transmitted connection request.

In step S1603, the digital camera 100 and the smartphone 200 establish wireless connection via BLE. In the second exemplary embodiment, since unencrypted communication is performed in wireless connection using BLE, the digital camera 100 and the smartphone 200 are able to perform BLE connection even if an encryption key is not currently recorded in the digital camera 100.

In step S1604, the smartphone 200 transmits the application ID 313 of the communication application 322 to the digital camera 100. The digital camera 100 records the application ID 313 as identification information about the smartphone 200.

In step S1605, the digital camera 100 transmits the camera ID 323 to the smartphone 200. The smartphone 200 determines that a connection partner to which the smartphone 200 has BLE-connected is the digital camera 100 based on the camera ID 323 received in the present step.

In step S1606, the smartphone 200 transmits, to the digital camera 100 via BLE communication, a request packet for requesting switching to BTC communication. In response to reception of the request packet, the digital camera 100 transitions to a state capable of performing connection using BTC.

In step S1607, the digital camera 100 and the smartphone 200 disconnect a wireless connection using BLE.

In step S1608, the smartphone 200 transmits, to the digital camera 100, a packet for requesting a wireless connection using BTC with use of the camera ID 323.

In step S1609, the digital camera 100 and the smartphone 200 fail in establishing a wireless connection using BTC. This is because, since the encryption key 325, which is connection information about the former digital camera 100, is currently recorded in the smartphone 200, the smartphone 200 is not able to generate an encryption key for the further digital camera 100. At this time, the smartphone 200 may be unable to issue a notification of this error before a predetermined time such as about one minute elapses. In this case, the user is not able to immediately become aware that BTC connection is failed.

Figure 17:
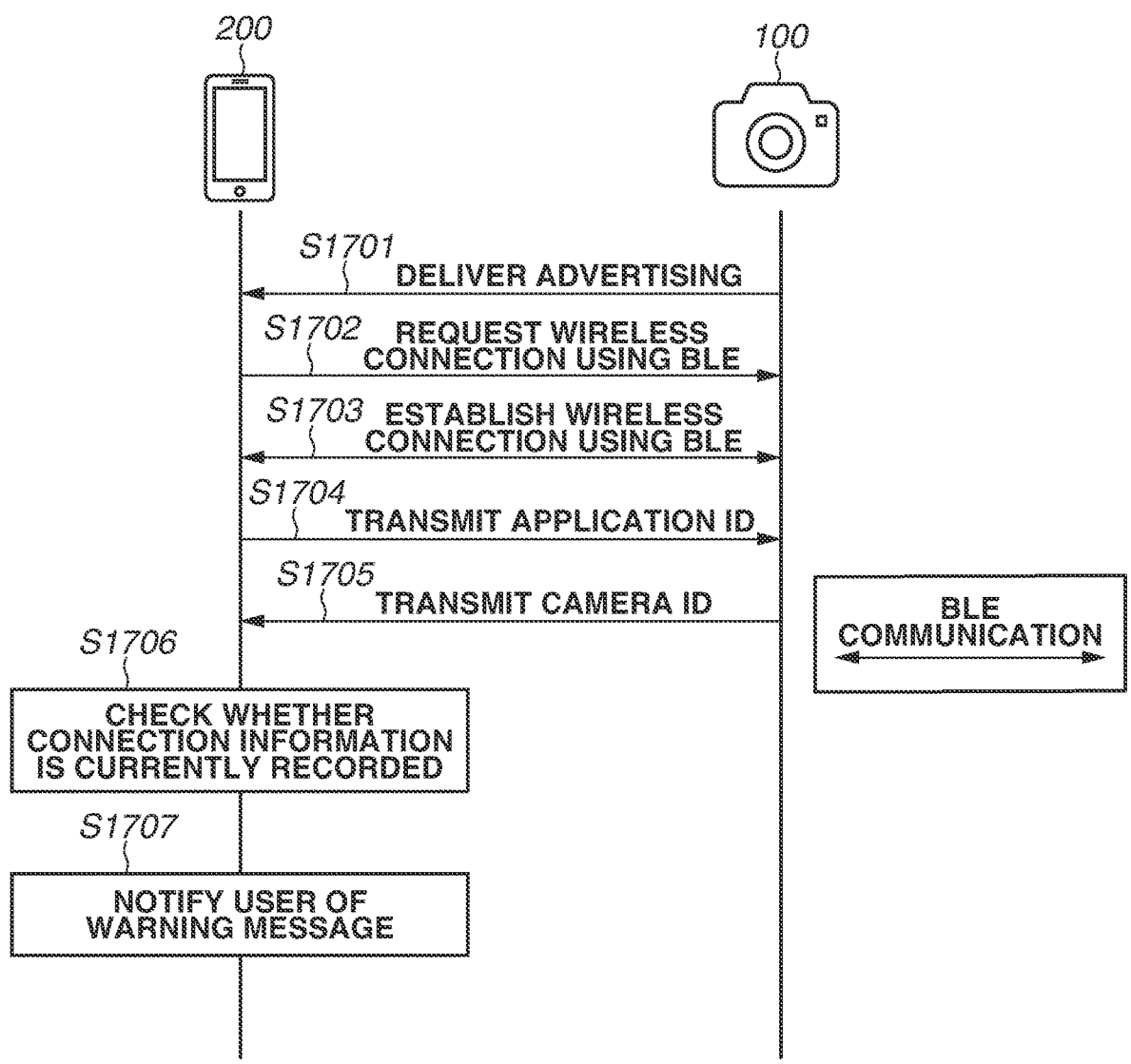
FIG. 17 is a sequence diagram illustrating an example of processing in which, in a case where connection information about the smartphone recorded in the digital camera has been deleted, the smartphone issues a notification indicating that the connection information is not currently recorded in the digital camera, in the second exemplary embodiment.

Therefore, before attempting to perform a BTC connection with the digital camera 100, the smartphone 200 notifies the user that BTC connection is impossible. FIG. 17 is a sequence diagram illustrating an example of processing in which, in a case where connection information about the smartphone 200 recorded in the digital camera 100 has been deleted, the smartphone 200 issues a notification indicating that the connection information is not currently recorded in the digital camera 100. Processing in the present sequence is started in response to, for example, the user operating the digital camera 100 to issue an instruction for starting pairing.

In step S1701, the digital camera 100 delivers advertising for requesting pairing to therearound via BLE. Unlike processing in step S801 illustrated in FIG. 8, the advertising which the digital camera 100 delivers does not include the application ID 313. The smartphone 200 receives the advertising delivered by the digital camera 100. In the present sequence, the smartphone 200 determines to start pairing processing with the digital camera 100.

In step S1702, the smartphone 200 transmits a connection request to the digital camera 100 via BLE.

In step S1703, the digital camera 100 and the smartphone 200 establish BLE connection.

In step S1704, the smartphone 200 transmits the application ID 313 to the digital camera 100. The digital camera 100 receives the transmitted application ID 313. Moreover, the digital camera 100 records the received application ID 313 as identification information about the smartphone 200.

In step S1705, the digital camera 100 transmits the camera ID 323 to the smartphone 200. The smartphone 200 receives the transmitted camera ID 323.

In step S1706, the smartphone 200 determines, based on the camera ID 323 received in step S1705, that the digital camera 100 is a digital camera pairing with which has been previously performed via BTC. Then, the smartphone 200 determines whether connection information about the digital camera 100 is currently recorded therein. In the second exemplary embodiment, the smartphone 200 determines whether connection information about the digital camera 100 is currently recorded therein by referring to the non-volatile memory 203 to determine whether the encryption key 325 is currently recorded therein. In the present sequence, the smartphone 200 determines that the encryption key 325 is currently recorded therein. As mentioned above, since connection information about the smartphone 200 has been deleted in the digital camera 100, the digital camera 100 and the smartphone 200 fail in performing subsequent connection processing using BTC.

Figure 18:
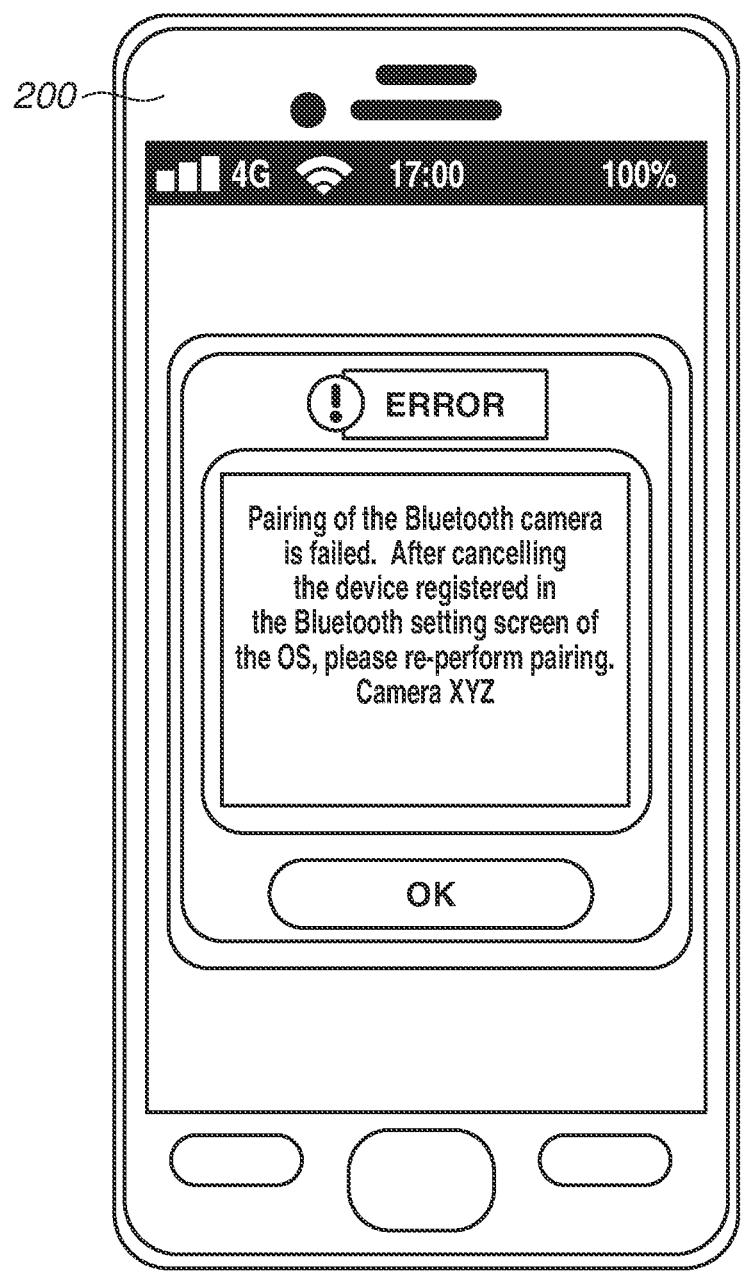
FIG. 18 illustrates an example of a warning message which the smartphone displays in the second exemplary embodiment.

Therefore, in step S1707, the smartphone 200 notifies the user of a message warning that the smartphone 200 is unable to perform pairing with the digital camera 100. FIG. 18 illustrates an example of a warning message which the smartphone 200 displays. The content of the warning message includes, for example, a content which prompts the user to delete connection information about the digital camera 100 recorded in the smartphone 200 and re-perform pairing with the digital camera 100.

Thus far is the description of an example of processing in which, in a case where connection information about the smartphone 200 recorded in the digital camera 100 has been deleted, the smartphone 200 issues a notification indicating that the connection information is not currently recorded in the digital camera 100. With this processing, the smartphone 200 is able to notify the user that, in response to establishing BLE connection, the smartphone 200 is unable to perform BTC connection.

Furthermore, while, in the second exemplary embodiment, a case where connection information required for BTC communication about the smartphone 200 has been deleted has been described, even in a case where connection information required for wireless LAN communication about the smartphone 200 has been deleted, the smartphone 200 can issue a similar notification. In a case where connection information required for wireless LAN communication about the smartphone 200 has been deleted, the smartphone 200 notifies the user that, in response to establishing BLE connection, the smartphone 200 is unable to perform connection using a wireless LAN.

<Operation of Digital Camera 100>

An operation of the digital camera 100 in the second exemplary embodiment is similar to the operation described with reference to FIG. 10 to FIG. 12 in the first exemplary embodiment.

<Operation of Smartphone 200>

Figure 19:
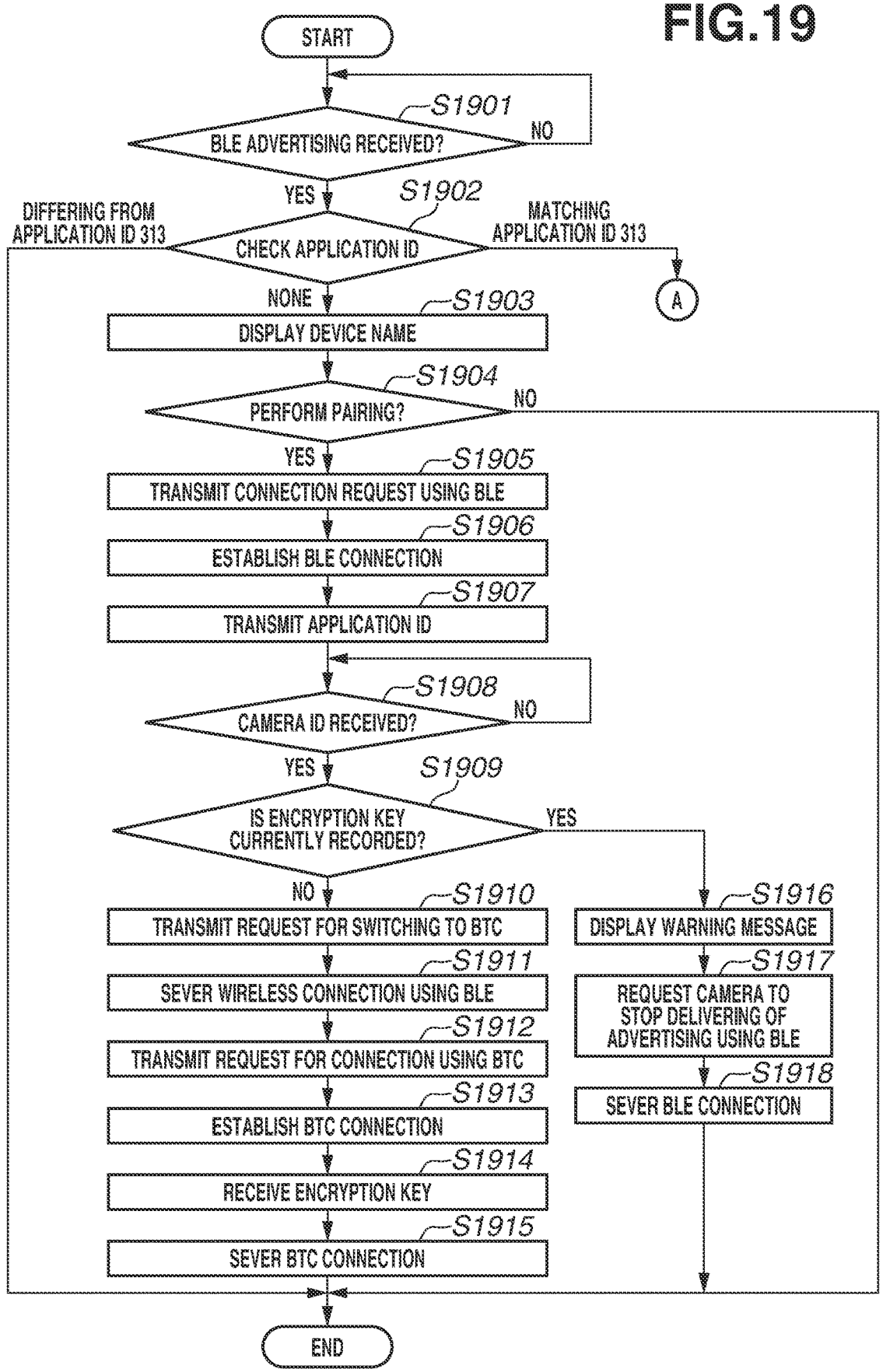
FIG. 19 is a flowchart illustrating an example of an operation of the smartphone in the second exemplary embodiment.

An operation of the smartphone 200 in the second exemplary embodiment is described. FIG. 19 is a flowchart illustrating an example of an operation of the smartphone 200 in the second exemplary embodiment. The present processing is implemented by the control unit 201 loading a program recorded on the non-volatile memory 203 onto the working memory 204 and executing the program. Processing in the present flowchart is started in response to, for example, the control unit 201 activating the communication application 322.

In step S901, the control unit 201 determines whether advertising has been received via the first near field wireless unit 212*a*. The control unit 201 waits until reception of advertising. If it is determined by the control unit 201 that advertising has been received (YES in step S1901), the processing proceeds to step S1902.

In step S1902, the control unit 201 determines whether an application ID is included in the advertising received in step S1901. Moreover, in a case where an application ID is included in the advertising, the control unit 201 determines whether the application ID matches the application ID 313.

If it is determined by the control unit 201 that no application ID is included in the advertising (NONE in step S1902), the processing proceeds to step S1903. If it is determined by the control unit 201 that the application ID included in the advertising differs from the application ID 313 (DIFFERING FROM APPLICATION ID 313 in step S1902), the processing ends. If it is determined by the control unit 201 that the application ID included in the advertising matches the application ID 313 (MATCHING APPLICATION ID 313 in step S1902), the processing proceeds to step S1303 illustrated in FIG. 13. In the second exemplary embodiment, a case where the control unit 201 has determined that no application ID is included in the advertising is described.

In step S1903, the control unit 201 displays the device name of the device which has transmitted the advertising on the display unit 206. In the second exemplary embodiment, the control unit 201 displays the identification name of the digital camera 100 on the display unit 206.

In step S1904, the control unit 201 receives, via the operation unit 205, a user operation for issuing an instruction as to whether to perform pairing with the digital camera 100. If the control unit 201 has been instructed by the user to perform pairing (YES in step S1904), the processing proceeds to step S1905. If the control unit 201 has been instructed by the user not to perform pairing (NO in step S1904), the processing ends.

In step S1905, the control unit 201 transmits a connection request to the digital camera 100 via the first near field wireless unit 212a. Processing in the present step is equivalent to, for example, processing in step S402 illustrated in FIG. 4.

In step S1906, the control unit 201 establishes BLE connection with the digital camera 100 via the first near field wireless unit 212a.

In step S1907, the control unit 201 transmits the application ID 313 of the communication application 322 to the digital camera 100 via the first near field wireless unit 212a.

In step S1908, the control unit 201 determines whether a camera ID has been received from the digital camera 100 via the first near field wireless unit 212a. The control unit 201 waits until reception of a camera ID. If it is determined by the control unit 201 that a camera ID has been received (YES in step S1908), the processing proceeds to step S1909.

In step S1909, the control unit 201 determines whether the encryption key 325 of the digital camera 100 is currently recorded on the non-volatile memory 203. If it is determined by the control unit 201 that the encryption key 325 is not currently recorded (NO in step S1909), the processing proceeds to step S1910. If it is determined by the control unit 201 that the encryption key 325 is currently recorded (YES in step S1909), the processing proceeds to step S1916.

Processing operations in step S1910 to step S1915 are similar to processing operations in step S1406 to step S1411 illustrated in FIG. 14, respectively, and are, therefore, omitted from description.

In step S1916, the control unit 201 issues a notification about a warning message on the display unit 206. For example, the control unit 201 displays a warning message such as that illustrated in FIG. 18. In the second exemplary embodiment, the control unit 201 causes the content for prompting re-performing a pairing operation to be included in the warning message, as illustrated in FIG. 18.

In step S1917, the control unit 201 transmits, via the second near field wireless unit 212b, a request packet for stopping delivery of advertising for reconnection using BLE in such a way as to cause the digital camera 100 not to deliver advertising after BLE connection is disconnected. With this processing, since, in step S1918 and subsequent steps, the digital camera 100 does not deliver advertising for reconnection using BLE, it is possible to reduce power consumption of the digital camera 100.

In step S1918, the control unit 201 disconnects the BLE connection with the digital camera 100, and then ends the processing.

Thus far is the description of an example of an operation of the smartphone 200.

Furthermore, while, in step S1916, the control unit 201 issues a notification indicating a warning message, to cause the digital camera 100 to display the warning message, the control unit 201 can transmit, to the digital camera 100, a packet for requesting the digital camera 100 to display the warning message.

Moreover, instead of displaying a warning message in step S1916, the control unit 201 can delete the encryption key 325. In this case, the processing proceeds to step S1910, so that the control unit 201 can automatically perform pairing processing.

Thus far is the description of the second exemplary embodiment. In the second exemplary embodiment, in a case where the smartphone 200 has established a connection using BLE with a digital camera 100 an encryption key for BTC about which has been deleted, the smartphone 200 displays a warning message for prompting re-performing pairing with the digital camera 100. This enables the user to become aware that a discrepancy is occurring between connection information which is currently recorded in the smartphone 200 and connection information which is currently recorded in the digital camera 100.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-203426 filed Nov. 8, 2019, which is hereby incorporated by reference herein in its entirety.

What is claimed is:

1. A communication apparatus comprising:
a first hardware communication unit configured to perform unencrypted communication with an external apparatus in conformity with a first standard for communication;
a second hardware communication unit configured to perform encrypted communication with the external apparatus in conformity with a second standard for communication, which is different from the first standard for communication;
a recording medium;
a notification unit; and
a control unit,
wherein, in a case where the control unit has received, from the external apparatus via the first hardware communication unit, connection information used for the second hardware communication unit to perform encrypted communication with the external apparatus, the control unit records the connection information on the recording medium,
wherein, in a case where the control unit has established a connection with the external apparatus via the first hardware communication unit, the control unit determines whether the connection information recorded by being received from the external apparatus is currently recorded on the recording medium,
wherein, in a case where the control unit has determined that the connection information recorded by being received from the external apparatus is not currently recorded on the recording medium, the control unit causes the notification unit to issue a notification indicating that the connection information is not currently recorded,
wherein, in a case where the control unit has received, from the external apparatus via the first hardware communication unit, a packet for requesting connection compliant with the first standard, the control unit establishes communication with the external apparatus via the first hardware communication unit,
wherein, in a case where the control unit has determined that the connection information is not currently recorded on the recording medium, the control unit requests the external apparatus not to further transmit a packet for requesting connection compliant with the first standard, and disconnects the connection established via the first hardware communication unit with the external apparatus, and
wherein a communication speed of a communication performed by the second hardware communication unit is higher than a communication speed of a communication performed by the first hardware communication unit.

2. The communication apparatus according to claim 1, wherein, in a case where the control unit has determined that the connection information recorded by being received from the external apparatus is not currently recorded on the recording medium, the control unit controls the first hardware communication unit to disconnect the established connection.

3. The communication apparatus according to claim 1, wherein, in a case where the control unit has determined that the connection information recorded by being received from the external apparatus is currently deleted from the recording medium, the control unit causes the notification unit to issue a notification indicating that the connection information is not currently recorded.

4. The communication apparatus according to claim 1,
wherein, in a case where the control unit has received, from the external apparatus, a packet for requesting establishing connection compliant with the first standard, the control unit establishes communication with the external apparatus via the first hardware communication unit,
wherein, in a case where the control unit has determined that identification information indicating the external apparatus is included in the packet, the control unit establishes communication with the external apparatus via the second hardware communication unit with use of the connection information, and
wherein, in a case where the control unit has determined that the identification information is not included in the packet, the control unit determines whether the connection information is currently recorded on the recording medium.

5. The communication apparatus according to claim 1, wherein, in a case where the control unit has determined that the connection information is not currently recorded on the recording medium, without establishing connection to be performed via the second hardware communication unit, the control unit causes the notification unit to issue a notification indicating that the connection information is not currently recorded.

6. The communication apparatus according to claim 1, wherein, in a case where the control unit has determined that the connection information is currently recorded on the recording medium, the control unit performs control to maintain communication performed via the first hardware communication unit.

7. The communication apparatus according to claim 1,
wherein the control unit records first identification information for identifying the communication apparatus on the recording medium, and
wherein, in response to establishing connection with the external apparatus using the first hardware communication unit, the control unit transmits the first identification information for identifying the communication apparatus to the external apparatus via the first hardware communication unit, and receives second identification information for identifying the external apparatus from the external apparatus via the first hardware communication unit.

8. The communication apparatus according to claim 7,
wherein, in a case where the control unit has received a packet for requesting connection compliant with the first standard from the external apparatus, the control unit determines whether the first identification information is included in the packet, and
wherein, in a case where the control unit has determined that the first identification information is included in the packet, the control unit establishes connection with the external apparatus via the first hardware communication unit and receives the second identification information via the connection established using the first hardware communication unit, and, in a case where the control unit has determined that the first identification information is not included in the packet, the control unit receives the connection information from the external apparatus by communication performed via the first hardware communication unit.

9. The communication apparatus according to claim 7, wherein the first identification information is an identifier (ID) of an application for performing wireless communication with the external apparatus in the communication apparatus, and
wherein the second identification information is a media access control (MAC) address of the external apparatus.

10. The communication apparatus according to claim 7, wherein, in a case where the control unit has received the connection information, the control unit records the connection information on the recording medium while associating the connection information with the second identification information, and
wherein, in a case where the control unit has received the second identification information, the control unit determines whether the connection information corresponding to the second identification information is currently recorded on the recording medium.

11. The communication apparatus according to claim 1, further comprising a hardware operation unit configured to receive, from a user, an instruction for deleting connection information recorded on the recording medium.

12. The communication apparatus according to claim 1, wherein software for implementing a function for deleting the connection information is an operating system, and
wherein software for implementing a function for causing the notification unit to issue a notification indicating that the connection information is not currently recorded is an application installed on the operating system.

13. The communication apparatus according to claim 1, wherein the connection information is an encryption key.

14. The communication apparatus according to claim 1, further comprising a display unit,
wherein the notification unit causes the display unit to display a message indicating that the connection information is not currently recorded, to a user.

15. The communication apparatus according to claim 1, wherein the first standard is Bluetooth Low Energy, and the second standard is Bluetooth Classic.

16. The communication apparatus according to claim 1, wherein the first standard is Bluetooth, and the second standard is IEEE 802.11.

17. A control method for a communication apparatus including a first hardware communication unit configured to perform unencrypted communication with an external apparatus in conformity with a first standard for communication, a second hardware communication unit configured to perform encrypted communication with the external apparatus in conformity with a second standard for communication, which is different from the first standard for communication, a recording medium, and a notification unit, the control method comprising:
in a case where connection information used for the second hardware communication unit to perform encrypted communication with the external apparatus has been received from the external apparatus via the first hardware communication unit, recording the connection information on the recording medium;
in a case where connection with the external apparatus has been established via the first hardware communication unit, determining whether the connection information used for the second hardware communication unit to perform encrypted communication with the external apparatus recorded by being received from the external apparatus is currently recorded on the recording medium;
in a case where it has been determined that the connection information used for the second hardware communication unit to perform encrypted communication with the external apparatus recorded by being received from the external apparatus is not currently recorded on the recording medium, causing the notification unit to issue a notification indicating that the connection information is not currently recorded;
in a case where a packet for requesting connection compliant with the first standard is received from the external apparatus via the first hardware communication unit, establishing communication with the external apparatus via the first hardware communication unit;
in a case where it has been determined that the connection information is not currently recorded on the recording medium, requesting the external apparatus not to further transmit a packet for requesting connection compliant with the first standard, and disconnecting the connection established via the first hardware communication unit with the external apparatus; and
a communication speed of a communication performed by the second hardware communication unit is higher than a communication speed of a communication performed by the first hardware communication unit.

18. A non-transitory recording medium having recorded thereon computer-executable instructions that, when executed by a computer, cause the computer to perform a control process for a communication apparatus, the communication apparatus including a first hardware communication unit configured to perform unencrypted communication with an external apparatus in conformity with a first standard for communication, a second hardware communication unit configured to perform encrypted communication with the external apparatus in conformity with a second standard for communication, which is different from the first standard for communication, a recording medium, and a notification unit, the control process comprising:
in a case where connection information used for the second hardware communication unit to perform encrypted communication with the external apparatus has been received from the external apparatus via the first hardware communication unit, recording the connection information on the recording medium;
in a case where connection with the external apparatus has been established via the first hardware communication unit, determining whether the connection information used for the second hardware communication unit to perform encrypted communication with the external apparatus recorded by being received from the external apparatus is currently recorded on the recording medium;
in a case where it has been determined that the connection information used for the second hardware communication unit to perform encrypted communication with the external apparatus recorded by being received from the external apparatus is not currently recorded on the recording medium, causing the notification unit to issue a notification indicating that the connection information is not currently recorded;
in a case where a packet for requesting connection compliant with the first standard is received from the external apparatus via the first hardware communication unit, establishing communication with the external apparatus via the first hardware communication unit;

in a case where it has been determined that the connection information is not currently recorded on the recording medium, requesting the external apparatus not to further transmit a packet for requesting connection compliant with the first standard, and disconnecting the connection established via the first hardware communication unit with the external apparatus; and a communication speed of a communication performed by the second hardware communication unit is higher than a communication speed of a communication performed by the first hardware communication unit.

* * * * *